US007412463B2

(12) United States Patent
Mitchell et al.

(10) Patent No.: US 7,412,463 B2
(45) Date of Patent: Aug. 12, 2008

(54) DYNAMIC LEGAL DATABASE PROVIDING HISTORICAL AND CURRENT VERSIONS OF BODIES OF LAW

(75) Inventors: Fred C. Mitchell, Princeton, NJ (US); Peter Mosca, Belle Mead, NJ (US); James Michael Snyder, Mount Holly, NJ (US)

(73) Assignee: Bloomberg Finance L.P.

( * ) Notice: Subject to any disclaimer, the term of this patent is extended or adjusted under 35 U.S.C. 154(b) by 0 days.

(21) Appl. No.: 10/045,586

(22) Filed: Jan. 11, 2002

(65) Prior Publication Data

US 2003/0135520 A1 Jul. 17, 2003

(51) Int. Cl.
G06F 17/30 (2006.01)

(52) U.S. Cl. .................. 707/203; 715/227; 715/229

(58) Field of Classification Search ............ 703/3, 703/102, 10, 203; 715/514, 511; 707/203, 707/3, 102, 10, 2; 717/227, 229
See application file for complete search history.

(56) References Cited

U.S. PATENT DOCUMENTS

| 4,558,413 | A | 12/1985 | Schmidt et al. |
| 4,627,019 | A | 12/1986 | Ng |
| 4,714,992 | A | 12/1987 | Gladney et al. |
| 4,853,843 | A | 8/1989 | Ecklund |
| 4,875,159 | A | 10/1989 | Cary et al. |
| 5,287,496 | A | 2/1994 | Chen et al. |
| 5,317,729 | A | 5/1994 | Mukherjee et al. |
| 5,414,838 | A | 5/1995 | Kolton et al. |
| 5,444,615 | A | 8/1995 | Bennett et al. |
| 5,544,352 | A | 8/1996 | Egger |
| 5,708,806 | A * | 1/1998 | DeRose et al. ........... 707/104.1 |
| 5,740,425 | A | 4/1998 | Povilus |
| 5,740,549 | A | 4/1998 | Reilly et al. |
| 5,761,662 | A | 6/1998 | Dasan |
| 5,794,236 | A | 8/1998 | Mehrle |
| 5,815,392 | A | 9/1998 | Bennett et al. |
| 5,819,273 | A | 10/1998 | Vora et al. |

(Continued)

FOREIGN PATENT DOCUMENTS

AU 199857414 B2 8/1998

(Continued)

OTHER PUBLICATIONS

William McClaren et al., Using Westlaw.com; Oct. 1999, pp. 1-29.*

(Continued)

*Primary Examiner*—Jean M Corrielus
(74) *Attorney, Agent, or Firm*—Frank J. DeRosa; Frommer Lawrence & Haug LLP

(57) ABSTRACT

Information collections defining a common subject such as a codified or uncodified body of law are stored on a computer readable medium in association with temporal information indicating the state or status with respect to time of parts of the information collection, including different versions of the same part. Parts of an information collection that are different versions of each other have different temporal information associated therewith and can be accessed based on the temporal information. Thus, the temporal information may be used to control access to and display of parts of the subject in a computer system based on time as search or request parameter. In a preferred embodiment, the subject is a statutory body of law such as the United States Code. Sections of the Code are stored in association with temporal information such as date of enactment, effective date and termination date. A researcher can access a version of any part of the Code in effect at any particular time.

48 Claims, 20 Drawing Sheets

U.S. PATENT DOCUMENTS

| | | | |
|---|---|---|---|
| 5,835,087 | A | 11/1998 | Herz et al. |
| 5,940,800 | A | 8/1999 | Bennett et al. |
| 5,946,682 | A | 8/1999 | Wolfe |
| 5,987,454 | A | 11/1999 | Hobbs |
| 6,014,662 | A | 1/2000 | Moran et al. |
| 6,025,844 | A | 2/2000 | Parsons |
| 6,026,388 | A | 2/2000 | Liddy et al. |
| 6,026,409 | A | 2/2000 | Blumenthal |
| 6,098,070 | A * | 8/2000 | Maxwell ............... 707/102 |
| 6,101,493 | A | 8/2000 | Marshall et al. |
| 6,105,044 | A * | 8/2000 | DeRose et al. ............ 715/514 |
| 6,233,592 | B1 | 5/2001 | Schnelle et al. |
| 6,256,620 | B1 | 7/2001 | Jawahar et al. |
| 6,256,623 | B1 | 7/2001 | Jones |
| 6,263,351 | B1 | 7/2001 | Wolfe |
| 6,304,259 | B1 * | 10/2001 | DeStefano ............... 345/805 |
| 6,411,939 | B1 * | 6/2002 | Parsons ................. 705/35 |
| 6,529,911 | B1 * | 3/2003 | Mielenhausen .......... 707/100 |
| 2001/0034739 | A1 * | 10/2001 | Anecki et al. ........... 707/500 |
| 2003/0041305 | A1 | 2/2003 | Schnelle et al. |
| 2003/0070144 | A1 | 4/2003 | Schnelle et al. |
| 2003/0177443 | A1 | 9/2003 | Schnelle et al. |

FOREIGN PATENT DOCUMENTS

| | | |
|---|---|---|
| CA | 2278454 | 8/1998 |
| CA | 2323245 | 4/2002 |
| NZ | 336782 | 1/2000 |
| WO | WO 97/15890 | 5/1997 |
| WO | WO 98/34179 | 8/1998 |
| WO | WO 00/67162 | 9/2000 |
| WO | WO 01/11559 | 2/2001 |
| WO | WO 00/37178 | 5/2001 |

OTHER PUBLICATIONS

William McClaren et al., Using Westmate, version 7.2 for Windows 95 and Windows NT, 1999, pp. 1-29.*

Lexis-Nexis, Learning Lexis, A Handbook for Modern Legal Research, 1998, pp. 40-41.*

Martin, P., "Digital Law: Some Speculations On The Future Of Legal Information Technology," dated May 1995, accessed at http://www.law.cornell.edu/papers/fut95fnl.htm (Mar. 20, 2001), pp. 1-14.

"Push Technology/Webcasting," Searchwebmanagement.com Definitions, dated Jul. 31, 2001, accessed at http://searchwebmanagement.techtarget.com/sDefinition/0,,sid27_gci213345,00.html (May 29, 2002), pp. 1-4.

Bruce, Tom, "Legal Information, Open Models And Current Practice", dated Jun. 6, 1995, accessed at http://www.lexum.umontreal.ca/en/equips/technologie/conferences/dac/bruce/bruce.html (Mar. 23, 2001), pp. 1-10.

Bloomberg Professional display screen, "Market Monitors," dated Dec. 10, 2001, 8 pp.

Westlaw Research Guide, West Group (Feb. 2001) pp. 111-134.

FindLaw, http://web.archive.org/web/20001201222600/my.findlaw.com/, Dec. 2000) 7 pgs.

Learning Lexis.com, Lexis Publishing, Dayton OH (2000), pp. 1-32.

Premise Software User Manual, West Publishing Company, St. Paul, MN (1989), 10 pgs.

New PDQ Clipping Service Delivers Your Results Automatically!, Password vol. 12, No. 8, Westlaw (Aug. 1992) pp. 8-9.

Kimmel, Jr. "Electronic Legal Research Ordering And Pricing System And Method Of Defining Electronic Legal Research Instructions and Values and Ordering and Pricing Electronic Legal Research Orders," U.S. Appl. No. 09/879,224, filed Jun. 12, 2001.

Weslaw.com Database,http://web.archive.org/web/19990125092722/http://westlaw.com/, (Jan. 1999), 29 pgs.

Nolo Self-Helf Law—Legal Information, Books, Software and Forms, http://web.archive.org/web/20010201070800/http://nolo.com, (Feb. 2001) 7 pgs.

Loislaw Database, http://web.archive.org/web/20011010000639/www.loislaw.com/Doors.htm, (Oct. 2001) 15 pgs.

Nolan, Geoffrey J., "Case Study: Web Delivery of Point-in-Time Legislation," retrieved from http://www.idealliance.org/papers/xml2001papers/tm/WEB on Sep. 23, 2004.

Tasmanian Legislation website, retrieved from http://web.archive.org/web/19981206175226/http://www.thelaw.tas.gov.au/ on Sep. 9, 2004.

Fuller et al., "Structured Answers for a Large Structured Document Collection," Proc. of the 16th Ann. Int'l ACM SIGIR Conf., Jul. 1993, pp. 204-213.

Rossiter et al., "Database Support for Very Large Hypertexts," Electronic Publishing, Aug. 1990, v. 3(3), pp. 141-154.

Baeza-Yates & Navarro, "Integrating Contents and Structure in Text Retrieval," ACM SIGMOD Record, Mar. 1996, v. 25, No. 1, pp. 67-79.

Agosti et al., "A Two-Level Hypertext Retrieval Model for Legal Data," Proc. of the 14th Ann. Int'l ACM SIGIR Conf., Sep. 1991, pp. 316-325.

Croft et al., "Interactive Retrieval of Complex Documents," Information Processing & Management, 1990, v. 26, No. 5, pp. 593-613.

Sciore, "Versioning and Configuration Management in an Object-Oriented Data Model," VLDB Journal, Jan. 1994, v. 3, No. 1, pp. 77-106.

Arnold-Moore, Timothy, "Databases of Legislation: The Problems of Consolidations," dated May 15, 1994, at http://www.mds.rmit.edu.au/~tja/papers/citri-94-9.pdf (Oct. 24, 2005).

Flynn, Peter, "Storage Models for SGML Data," post to comp.text.sgml (Oct. 8, 1994), at http://groups.google.com.au/group/comp.text.sgml/msg/6e1502c8c3108bc1 (Oct. 27, 2005).

Hivnor, Todd, "Storage Models for SGML Data," post to comp.text.sgml (Oct. 7, 1994), at http://groups.google.com.au/group/comp.text.sgml/msg/dc8e751f035851fc (Oct. 27, 2005).

Vittal, C., "Storage Models for SGML Data," post to comp.text.sgml (Oct. 8, 1994), at http://groups.google.com.au/group/comp.text.sgml/msg/1ec4d755688ad90d (Oct. 27, 2005).

McArthur, J., "Storage Models for SGML Data," post to comp.text.sgml (Oct. 8, 1994), at http://groups.google.com.au/group/comp.text.sgml/msg/b3aaeca872815cc6 (Oct. 27, 2005).

Arnold-Moore, T., "Storage Models for SGML Data," post to comp.text.sgml (Oct. 14, 1994), at http://groups.google.com.au/group/comp.text.sgml/msg/5725f2bc7de3c2a7 (Oct. 27, 2005).

Derose, S., "Storage Models for SGML Data," post to comp.text.sgml (Oct. 14, 1994), at http://groups.google.com.au/group/comp.text.sgml/msg/db60028a87b63574 (Oct. 27, 2005).

Flynn, Peter, "Storage Models for SGML Data," post to comp.text.sgml (Oct. 15, 1994), at http://groups.google.com.au/group/comp.text.sgml/msg/9f937b2ba84999cb (Oct. 27, 2005).

Nicol, Gavin, "Storage Models for SGML Data," post to comp.text.sgml (Oct. 16, 1994), at http://groups.google.com.au/group/comp.text.sgml/msg/26846eccc5c5b6e2 (Oct. 27, 2005).

Kimber, W., "Storage Models for SGML Data," post to comp.text.sgml (Oct. 8, 1994), at http://groups.google.com.au/group/comp.text.sgml/msg/c4daa132a830fb34 (Oct. 10, 2005).

Flynn, Peter, "Storage Models for SGML Data," post to comp.text.sgml (Oct. 10, 1994), at http://groups.google.com.au/group/comp.text.sgml/msg/dbeffe96380c48d7 (Oct. 27, 2005).

Kimber, W., "Storage Models for SGML Data," post to comp.text.sgml (Oct. 11, 1994), at http://groups.google.com.au/group/comp.text.sgml/msg/fd982ee8573bb8e3 (Oct. 27, 2005).

Derose, S., "Storage Models for SGML Data," post to comp.text.sgml (Oct. 17, 1994), at http://groups.google.com.au/group/comp.text.sgml/msg/5f99c6c094db8d6f (Oct. 27, 2005).

* cited by examiner

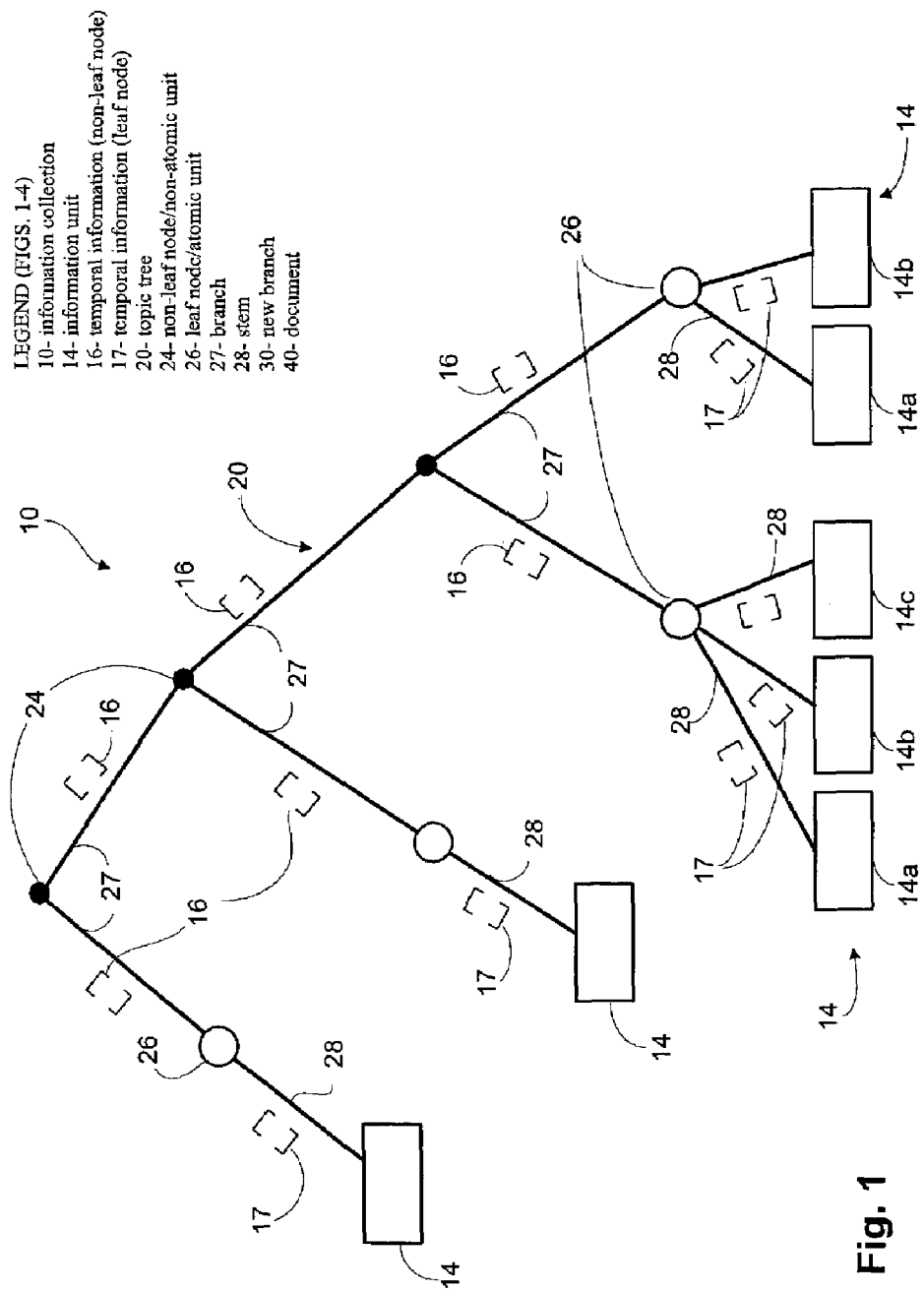

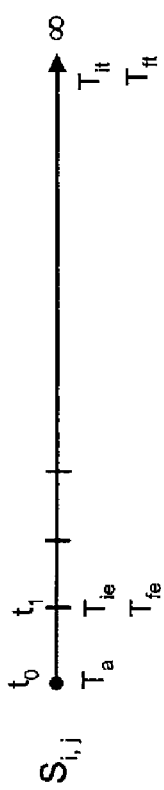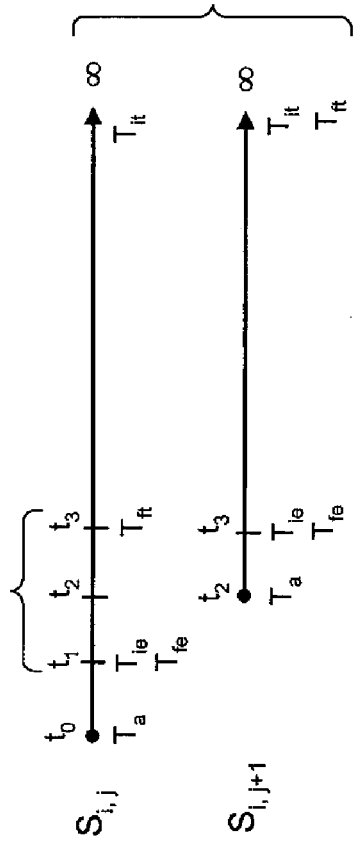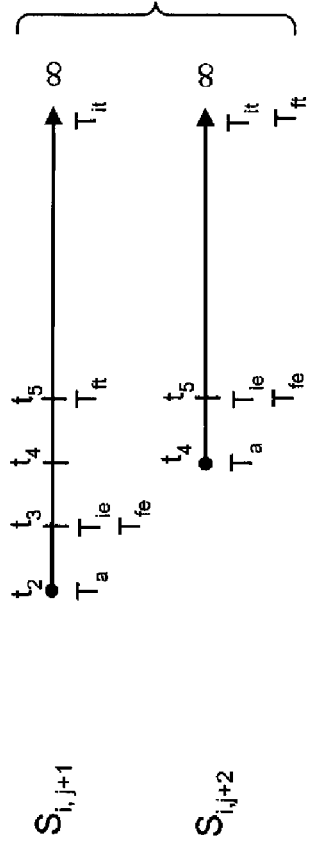

UNITED STATES CODE
TABLE OF SECTIONS AMENDED, ENACTED, OMITTED, REPEALED, OR TRANSFERRED
107th Congress, 1st Session
(Covering Public Laws 107-1 through 107-45)

*Columns 1 and 2*
    List U. S. Code titles and sections according to the Public Law from which they are derived. The letter "A" in column 1 means Appendix.

*Column 3*
    Contains special information as follows:
- "new" means a new section or new note, or all new text of an existing section or note.
- "nt" means note.
- "prec" means preceding.
- "fr" means a transfer from another section.
- "to" means a transfer to another section.
- "omitted" means the section is omitted.
- "repealed" means the section is repealed.

*Columns 4, 5, and 6*
    Contain Public Law, Section, and Statutes-at-Large citations.

Prepared by
Office of the Law Revision Counsel
U.S. House of Representatives
October 1, 2001

| U. S. Title | Code Section | Description | Pub. L. | Sec. | 115 Stat. |
|---|---|---|---|---|---|
| 2  | 61h-6 |         | 107-20 | 2803 | 185 |
| 5  | 101   | nt new  | 107-27 | 1    | 207 |
| 5  | 5542  | nt new  | 107-20 | 2605 | 178 |
| 5  | 8335  |         | 107-27 | 2(a) | 207 |
| 5  | 8425  |         | 107-27 | 2(b) | 207 |
| 7  | 1421  | nt      | 107-25 | 9    | 203 |
| 7  | 1522  | nt new  | 107-20 | 2103 | 165 |
| 8  | 1184  |         | 107-45 | 1    | 258 |
| 11 | 1201  |         | 107-8  | 1    | 10  |
| 11 | 1201  |         | 107-17 | 1    | 151 |
| 11 | 1201  | nt      | 107-8  | 1    | 10  |
| 11 | 1201  | nt      | 107-17 | 1    | 151 |
| 11 | 1201  | nt new  | 107-8  | 2    | 10  |
| 11 | 1201  | nt new  | 107-17 | 2    | 151 |
| 11 | 1202  |         | 107-8  | 1    | 10  |
| 11 | 1202  |         | 107-17 | 1    | 151 |
| 11 | 1203  |         | 107-8  | 1    | 10  |

FIG. 17

DYNAMIC LEGAL DATABASE PROVIDING HISTORICAL AND CURRENT VERSIONS OF BODIES OF LAW

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF INVENTION

The invention generally relates to collections of information and to systems that include, and/or access, retrieve, display and/or otherwise perform operations involving, such information collections. In particular, the invention relates to information collections that include information that may change with time, and which maintain a status, state or other relationship of information in the collection with respect to time. For example, the information collections may store historical as well as current information in association with related temporal information. In preferred embodiments, the information collections comprise a body of law and store historical and current versions of the body of law and parts thereof.

The term "information collection" is used herein in a broad sense and, unless the context indicates otherwise, encompasses databases, information bases, knowledge bases, bodies of information, etc., stored on a computer readable medium (electronic, magnetic, optical, etc.) or otherwise accessible by a computer device. Similarly "information" is used herein in a broad sense and, unless the context indicates otherwise, encompasses data. Unless the context indicates otherwise, the terms "information" and "data" may be used herein interchangeably, and the terms "information collection," information base," "knowledge base" and "database" may be used herein interchangeably. Similarly, the term "body of law" is used herein in a broad sense and encompasses bodies of law, codified and uncodified, such as codes, sets and codifications of laws, regulations, administrative rules, etc.

Some information collections include information that changes with time, and, in a sense, are dynamic. For example, a dictionary is a collection of words and their meanings; both the composition of the collection and the meanings of words in the collection may change over time. Frequently, words have multiple meanings in dictionaries and include historical information. Other examples are version control and configuration management systems that include historical and current versions of documents and software.

Still another example of an information collection that may change over time is a body of law, for example, promulgated by a governmental or quasi-governmental or other organization.

Such information collections may include historical information in the form of commentary, historical data, annotations, legislative history, references to other laws or judicial decisions, case notes, etc., as well as the current version of the body of law.

In the above examples, the subjects of the information collections can be rather large. To facilitate working (e.g., storing, accessing, retrieving, displaying, etc.) with an expansive subject, it is often necessary to provide some kind of organizational structure for the information. For some applications of a dynamic subject that may change over time, not only would an organizational structure be beneficial, but it would be useful to be able to track status or obtain the current state of parts of the subject, or to obtain historical information such as earlier versions of parts of the subject.

Bodies of law and/or parts thereof typically take effect on some date after enactment, and remain in effect until a specified expiration date, or indefinitely (or in perpetuity), unless altered or terminated by an intervening enactment. However, some bodies of law and/or parts thereof have retroactive effect from the date of enactment. In addition, at the time of enactment, a body of law or part thereof may have a duration that is not certain. For example, a body of law or part thereof becomes and/or ceases to be effective at some time triggered by an event that is not certain at the time that the body of law or part thereof was enacted. Possibly, such a body of law or part thereof might never actually go into effect if its initial effective conditions are not met. Likewise, a termination condition could fail to occur. It is also possible that a body of law or part thereof might be enacted with an effective date that, because of a subsequent enactment, may never take effect.

Therefore, ascertaining the status or state of any body of law or part thereof at any given time or interval of time can be difficult. Also, many bodies of law typically include one or more parts and/or sub-parts that may be modified independently of each other, which can compound any uncertainty or lack of clarity in the status or state of the parts and sub-parts.

SUMMARY OF INVENTION

The invention provides information collections that include information that may change with time, and which maintain a status or state or other relationship(s) of information in the collection with respect to time. The information collections may define a body of information on a common subject, e.g., a body of law, and the state or status thereof at any given time or within any given period of time, and provide access to a version of a part of the common subject that is or was active, or is or was applicable, or as it read, etc., at any given time or within any given period of time.

The invention provides a dynamic or date-sensitive information collection that cohesively provides access to a subject, e.g., for display, printing, storage, processing, etc., based on temporal concerns. For example, the information collections may store historical as well as current information in an integrated fashion.

As discussed below, a plurality of parts of the common subject are associated with temporal information indicating a state or status thereof, e.g., a temporal applicability with respect to time, with which access for retrieval, transmission, storage, display, printing, viewing, etc., is affected or controlled, or by, with or through which a part is made visible to a user in some way (collectively referred to herein as "visibility" for ease of reference and discussion). Other information, e.g., historical information, commentary, annotations, descriptive information, references and/or links to other parts of the subject or to other subjects, etc., may also be associated with parts of the common subject. For example, visibility of a part or parts of a common subject will depend upon the temporal information associated therewith. Visibility is a user-centric concept in which information stored in association with temporal information on a computer readable medium may or may not be accessible to a user, e.g., for retrieval, transmission, storage, display, printing and/or viewing based on one or more predetermined criteria. Thus, temporal information can be used as a filter so that only that part or those parts of the subject that satisfy a temporal criterion or criteria would be visible.

The inventive information collections are stored on a computer readable medium, and comprise a plurality of unique parts of information, each related to a common subject, e.g., a body of law, and each stored in association with temporal information of the type described herein. A part of a collection may be an atomic part that is not subdivided, or a non-atomic part that is subdivided. An example of a non-atomic part is a table of contents ("TOC") or index heading, while an example of an atomic part is a lowest level unit under the heading. The collections include a plurality of parts of the common subject that are different versions of each other (including parts which are replacements or substitutes for other parts, or parts that are the closest counterpart of other parts, etc.), and have different temporal information associated therewith. Different versions of the same part are also examples of atomic parts.

The collections are preferably arranged or configured to include a plurality of topics, each having associated therewith at least one part of the common subject and including information relating to the at least one part of the common subject. A topic may be atomic or non-atomic, and may simply be an identifier for a part of the common subject, or a name for such part, or a heading, for example in a TOC or index, etc. At least one of the topics has associated therewith a plurality of parts, e.g., atomic parts, of the common subject that are different versions of each other and that have different temporal information associated therewith. Information associated with a topic may include temporal information relating to the applicability with respect to time of at least one of the parts associated with the respective topic and/or historical information, descriptive information, etc. relating to such a part and/or the associated topic.

A part of the common subject and temporal and other information can be associated in various ways. They can be linked (e.g., hyperlinked) or included in the same file, or record or structured document, or they may be associated by pointers, etc. Topics and related parts of the common subject and other topics can be similarly associated.

In one embodiment, the information collection is represented by a hierarchical arrangement of topics and associated parts of the common subject. The information collection may be hierarchically organized as a topic tree having non-leaf nodes and leaf nodes representing topics. A non-leaf node is an example of a non-atomic topic and a leaf node is an example of an atomic topic. Each atomic part of the common subject associated with a respective topic is associated with the leaf node representing that topic. At least one TOC or index may be associated with at least one topic, each TOC or index including a reference to each part of the common subject associated with the respective topic. At least one heading in the TOC or index is a leaf node associated with a plurality of atomic parts of the common subject that are different versions of each other and have different temporal information associated therewith. Each atomic part of the common subject is associated with at least one heading. The headings may have temporal information associated therewith that indicate the temporal applicability of the part of the common subject associated therewith, as well as other information. Non-atomic headings or topics may include pointers to atomic parts, or be associated in any appropriate manner.

The temporal information associated with each part of the common subject may include a date range, and in that embodiment, the information collection is structured so that a part of the common subject can be accessed based on a date encompassed by the date range associated with that part. The date range may include a date on which that part of the common subject first became effective, or was the then or now current version. If the part of the common subject has a date when it ceases to be effective or current, or a date of termination, which may be unstated and hence would be indefinite or in perpetuity, the date range may also include that date. The temporal information may also include a date on which the part of common subject was created or adopted, which may also be included in the date range.

Parts of the common subject, and topics if applicable, may be included in structured documents, e.g. created with a markup language such as Extensible Markup Language ("XML") or Hypertext Markup Language ("HTML"). In such an embodiment, each part of the common subject that is a different version of the same part is preferably included in a separate structured document. A document can be or include an atomic part of a common subject, or a non-atomic part of a common subject. A part or document may include information or content in various forms, including by way of example, any or all of text, numbers, symbols, computer code, graphics, etc. While a document may contain a non-atomic part of the information collection, the document itself may not be subject to subdivision. Structured documents may include topics, headings, parts, etc., and may also include references to other related or associated documents.

In one embodiment, each part of the common subject and its associated temporal information are included in a separate lower level structured document. One or more higher level structured documents include information relating to a plurality of lower level structured documents that are in a hierarchical relationship with a respective higher level document. At least one of the higher level documents has information relating to a plurality of lower level documents that each includes a different atomic version of the same part of the common subject and the associated temporal information. At least one higher level document may include a topic and/or a TOC including a reference to a lower level document or documents associated therewith. At least one higher level document may include a topic and/or a TOC having a reference to one or more other higher level documents and to one or more lower level documents which are referenced by any of the plurality of higher level documents. The documents in this embodiment are hierarchically related in ancestral and descendant relationships. Also, at least one structured document may be provided indicating differences between different versions of the same part of the common subject.

The invention provides methods of providing the information collections described herein comprising: associating each part of the common subject with applicable temporal information, organizing parts of the common subject into topics at least one of which includes a plurality of atomic parts that are different versions of each other, and configuring the information collection to provide, in response to at least one request identifying a part and/or topic and/or a date, the identified part and/or topic having temporal information associated therewith that encompasses the date. The terms "request" and "query" are used in a broad sense and encompass inputs entered into a computer or computer system or equivalent device by any appropriate input device, including selection of input information displayed on a computer display using a pointing device such as a mouse. Also, a request may be entered by a single input, multiple inputs or a series or sequence of inputs.

In embodiments providing an information collection in structured documents, an inventive method comprises: associating each part of the common subject with applicable temporal information by including each part and its associated temporal information into a lower level structured document; associating applicable lower level documents with a higher level structured document by including in each higher level document information relating to one or more lower level document associated therewith; and configuring the information collection to provide, in response to at least one request identifying a part of the common subject and a date, a structured document including the identified part having temporal information associated therewith that encompasses the date.

Each part of the common subject is preferably stored discretely and the information collection preferably includes a construct for implementing a topic tree. The topic tree, which organizes the parts of the common subject according to a predetermined organization scheme, includes leaf nodes which represent the finest, smallest or most granular organizational breakdown, i.e., atomic parts. The atomic parts of the common subject are logically or relationally associated with the leaf nodes, which represent the atomic topics. Each non-root node of the topic tree may be logically associated with temporal information reflecting the temporal scope of the nodes and parts of the common subject associated therewith.

In the preferred embodiment, the topic tree is implemented by a hierarchical arrangement of structured documents which collectively provide a TOC. The parts of the common subject are provided in structured documents, and the TOC is also provided in structured documents that are logically positioned at nodes of the topic tree and include references to corresponding structured documents. In addition, each TOC document preferably includes a reference to an ancestral (e.g., parent) TOC document, if any, and all descendant (e.g., child) TOC documents. Each document reference in a TOC document preferably includes: (i) a label, reflecting an instance of a heading in the TOC; (ii) a file name of the referenced document; and (iii) a date range reflecting the combined temporal scope of all documents which descend lineally from the referenced document. In this manner, the label (which represents an entry or heading in the table of contents) can be displayed depending on its visibility.

The invention also provides systems for storing and accessing parts of a common subject having temporal information associated therewith. Such systems comprise an information collection as described herein stored on a computer readable medium, and means for accessing a part from the information collection in response to at least one request identifying the part and a date encompassed by the temporal information associated with that part. Such means may include a computer system comprising at least one computer, at least one computer display device and at least one computer input device.

A part of the common subject may be accessed in various ways. One way is to navigate to a display of interested parts along a hierarchical path (e.g., along a topic tree) until an identification or indication of the part of interest or versions thereof is reached. At that point, the part of interest can be selected. Alternatively, a part, topic or heading can be identified, and then navigation can proceed to the part of interest. If the identity of the part is known, navigation to a version can proceed directly by inputting the identity of that part. Navigation can be filtered at each level by temporal information.

In one embodiment, dates are displayed on a computer display device in association with at least an identity of a plurality of parts of the common subject that are different versions of each other, or a topic or heading related to the plurality of parts is displayed in association with dates. The part of interest can then be selected and accessed based on the displayed temporal information. In another embodiment, a part of the common subject and a date are input to the computer, and in response thereto, the computer accesses that part whose identity was input to the computer having temporal information encompassing the inputted date. Selection can be made, and search or request information or criteria can be input, using the computer input device. The collections may provide access to parts thereof for visibility purposes, as discussed herein, and for other purposes.

In a preferred embodiment, the subject is a codified body of law. A codified body of law may comprise the United States Code and/or the United States Code of Federal Regulations, state law codifications (e.g., New York Civil Procedure Law and Rules), regulations of state and federal administrative bodies, etc, and/or a title or chapter, etc., thereof These collections can provide access to a version of any part of the body of law based on the temporal information associated therewith. (Similarly, a common subject, not strictly a body of law, may be a set of rules and regulations, or bylaws, for a governmental, quasi-governmental or non-governmental organization.)

With respect to a codified body of law, a part thereof may be a title, chapter, section, or a subsection or paragraph of a section, etc. For example, a title, chapter or a section may be considered non-atomic parts, and a section or subsection or paragraph thereof may be considered atomic parts, depending upon how the collection is configured.

Temporal information stored in association with a part of a body of law may include a date or date range, as discussed above. Where the temporal information includes a date range, the date range may include a date on which the concerned part of the body of law is effective, and if that part of the body of law has a date of termination, the date range includes the date of termination, which may be unstated, and hence indefinite, or in perpetuity. The temporal information may also include a date on which the part of body of law was adopted, or enacted, which may be included in the date range. Other information stored in association with a part of a body of law may include historical information, commentary, annotations, descriptive information, legislative history, references, and/or links to laws and judicial decisions.

Inventive information collections may comprise unique units of information or subject matter that define the common subject, where each information unit includes or consists of a part of the common subject, and is stored in association with temporal information of the type described herein, and can be stored with other information of the type described herein, and other information. In a preferred embodiment, an information unit includes at least the associated temporal information. Similarly, inventive information collections may comprise unique topical units including or consisting of a topic, and may be stored with temporal information associated with the topic and/or any part or information unit associated with the topic, and other related information.

The description above with respect to parts and topics of a common subject applies to information units and topical units. For example, an information collection is structured so that an information unit can be accessed based at least on the temporal information associated therewith, and in an embodiment including topical units, the information collection is structured so that an information unit can be accessed based not only on the temporal information associated therewith, but also through a topical unit. Also, information units and topical units can be associated with temporal information, other information and/or other units in various ways. They can be linked (e.g., hyperlinked) or included in the same file, or record or structured document, or associated by pointers, etc. Information collections defined by information units and topical units can be stored and organized as described above.

As discussed above in connection with parts of a common subject, information units and associated temporal information, and other information, if applicable, and topical units and associated temporal information, and other information, if applicable, may be hierarchically organized as described above, and may be included in structured documents as described above.

BRIEF DESCRIPTION OF DRAWINGS

The foregoing and other aspects of the invention will become more readily apparent from the following description of illustrative embodiments thereof and the accompanying drawings, which illustrate the invention in an exemplary and non-limiting fashion. In the drawings:

FIGS. 1 and 1A are schematic diagrams illustrating a hierarchical tree structure for arranging data having temporal information associated therewith in an information collection according to the invention;

FIGS. 6A, 6B and 6C are diagrams that illustrate temporal applicability of parts of the United States Code body of law represented in FIG. 5;

FIG. 17 is a table of classifications for the United States Code produced by the Office of the Law Revision Counsel, U.S. House of Representatives.

DETAILED DESCRIPTION OF PREFERRED EMBODIMENTS

Figure 1A:
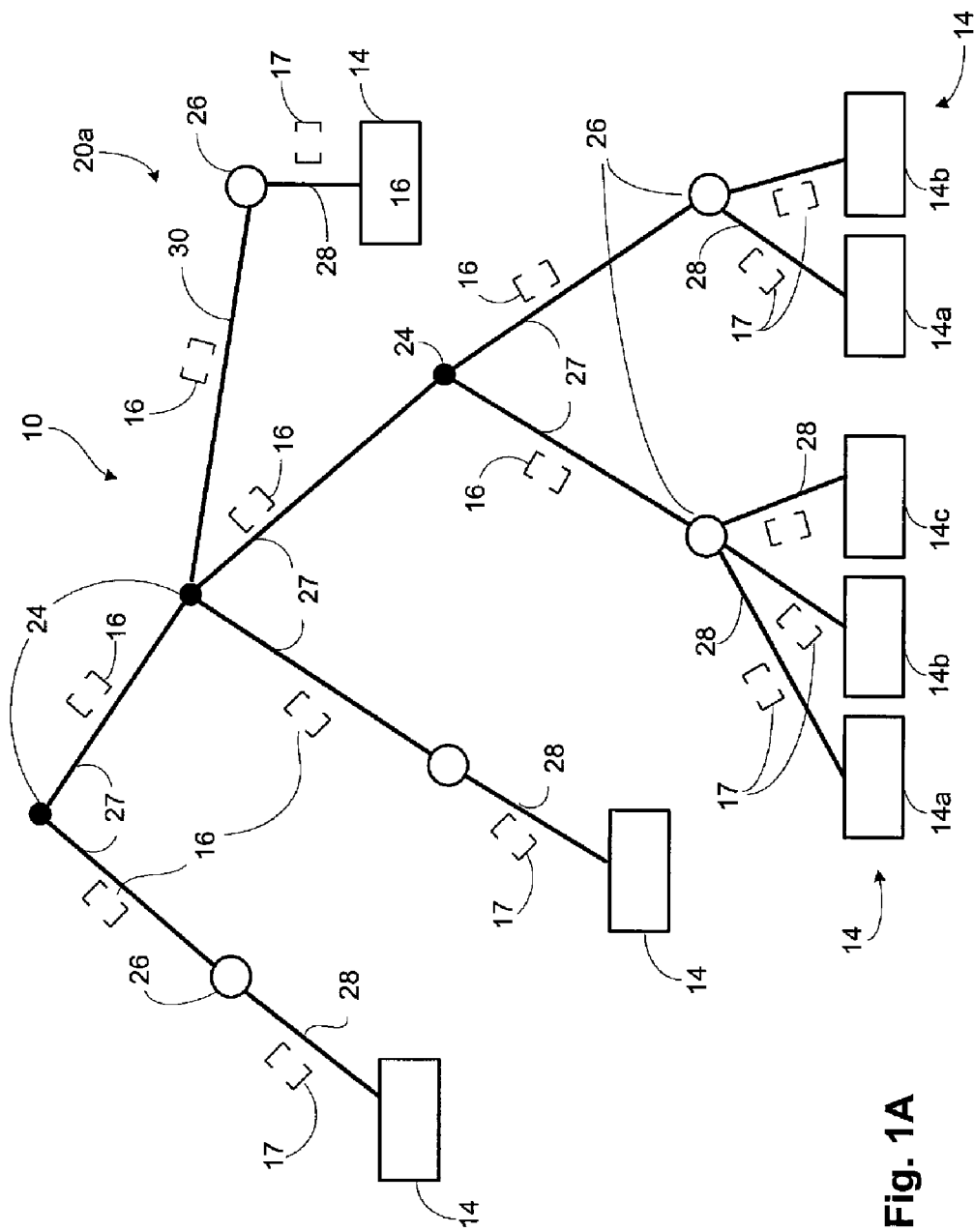

A general structure, according to one embodiment of the invention, of an information collection 10 that changes with time is represented in FIG. 1. The information collection 10 defines a body of information on a common subject, e.g., a body of law. Although the description below focuses on information collections defining a body of law, it should be understood that the invention is not limited thereto and applies to other bodies of information on a common subject. The visibility of parts of the body of information depends upon the temporal information associated therewith. The parts may be stored or organized in various ways, e.g., hierarchically.

The information collection 10 represented in FIG. 1 comprises unique parts of the common subject included in unique information (or subject matter) units referenced generally by 14. FIG. 1 depicts a hierarchical tree structure comprising a topic tree 20 that includes the information units 14. The topic tree 20 organizes or classifies the information units 14 according to an organizational scheme(s) or a pre-determined organizational structure that includes non-leaf nodes 24 and leaf nodes 26. The non-leaf nodes 24 (shown as smaller filled-in circles) of the tree 20 represent non-atomic topical units 24 which can be subdivided into smaller or more granular subtopics, e.g. atomic topical units 26, by branches 27. (The same reference number "24" is used to refer to non-leaf nodes and non-atomic topical units.) The leaf nodes 26 (shown as larger unfilled circles) of the tree 20 represent atomic topical units which are not subject to further organizational breakdown. (The same reference number "26" is used to refer to leaf nodes and atomic topical units.) The atomic topical units 26 thus represent the finest or most granular level of the organizational structure embodied in the tree. Some leaf nodes 24 have a plurality of leaves in the form of information units 14a, 14b, 14c connected thereto by stems 28. Thus, each atomic-topical unit 24 is associated with at least one information unit 14, and some have a plurality of information unites 14a, 14b, 14c, each of which includes or consists of a different version of the same part of the common subject, as discussed above.

To accommodate changes in the information collection 10 with time, the topic tree 20 is dynamic in nature. As such, information units 14 may be added to or deleted from the atomic topical units (leaf nodes) 26. Similarly, new branches 27 and/or nodes 24, 26 may be added to the tree, and existing branches and/or nodes may be deleted or moved to other positions in the tree. An example of this is shown in FIG. 1A where topic tree 20a includes a new branch 30 added to the topic tree 20 depicted in FIG. 1.

As shown in FIGS. 1 and 2, nodes 24 and 26, branches 27, stems 28 and information units 14 of the topic tree may be associated with temporal information, schematically represented by the "[]" symbols, that affect the visibility of the nodes, branches, or information units. Temporal information associated with a non-leaf node 24 or topical unit 24 is referenced by 16 while temporal information associated with a leaf node or topical unit 26 or an information unit 14 is referenced by 17. Temporal information associated with a node 26 may include the temporal information represented by 17 associated with each stem 28 (and information unit 14 connected to that stem). Temporal information associated with a node 24 may include the temporal information represented by 16 associated with branches connected to that node, and the temporal information associated with each other node connected to that branch. Thus, temporal information associated with a node or branch is preferably based on the collective temporal information associated with all information units that lineally descend from that node or branch, but may be independent thereof if desired.

Figure 2A:
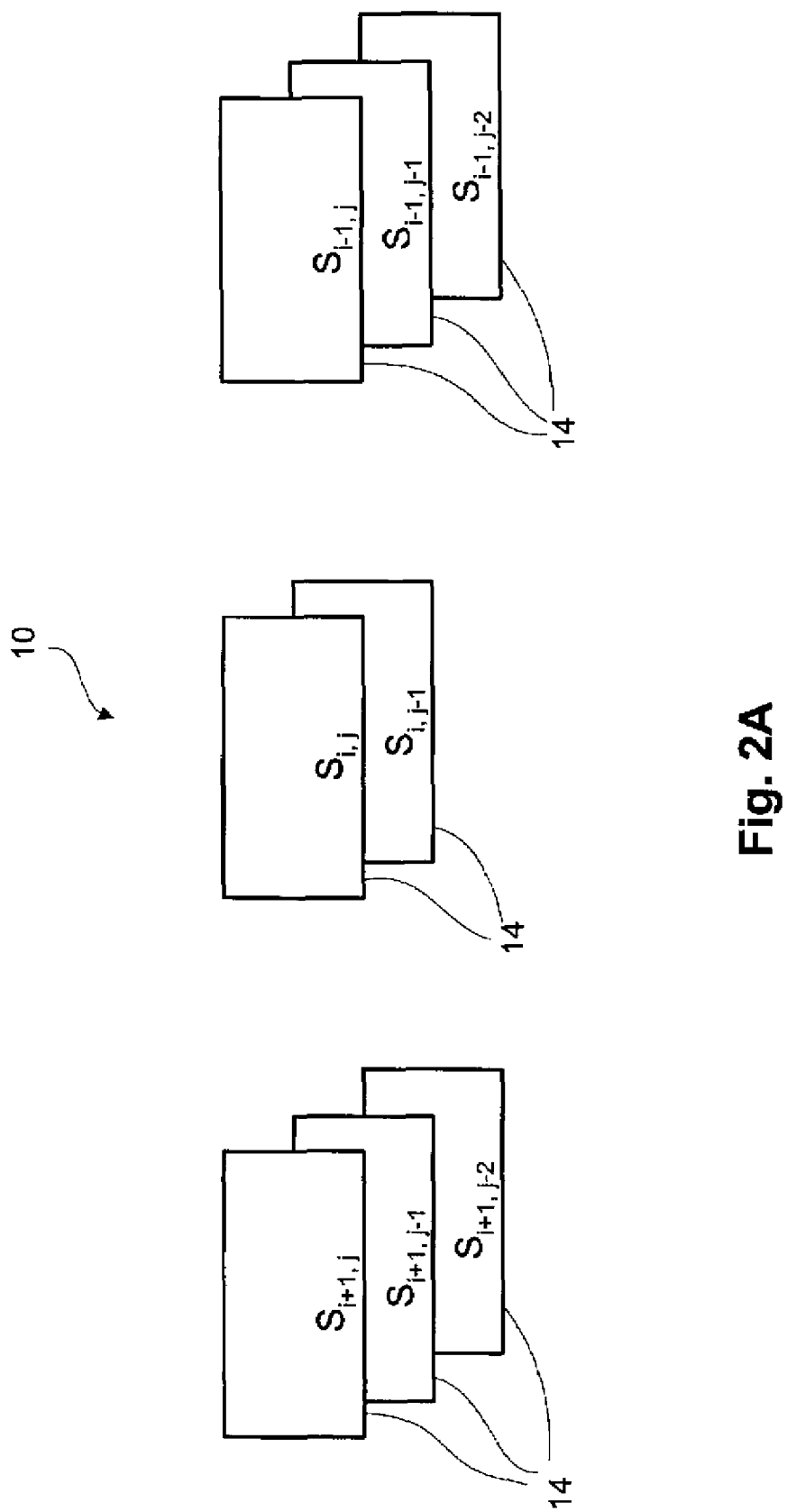
FIGS. 2A and 2B are schematic diagrams illustrating other structures for arranging data having temporal information associated therewith in an information collection according to the invention.

The topic tree 20 depicted in FIG. 1 may be provided or encoded as a discrete hierarchical construct in the information collection, or a hierarchy can be inherent through the manner in which the information units 14 are defined. For example, FIG. 2A shows a representation of an information collection 10 that does not have an express or discrete hierarchical data structure for a topic tree, but has identifiable data structures for information units 14, which encompass parts of a common subject. For example, the information units 14 can include the content (e.g., text, numbers, symbols, computer code, graphics) of distinct parts of the common subject. Nevertheless, a hierarchical structure is inherently present because the subject is of a hierarchical nature, as for example a body of law codified via a systematic numbering and organizational structure (e.g., the body of law has been organized into "titles" and "sections").

For example, the $S_{i,j}$ notation in FIG. 2A is one way to denote that the information units 14 represent or include different versions of the same part of the common subject. $S_i$ and $S_{i+/-1}$ denote an $i^{th}$, and $i^{th+/-1}$ part of the common subject. However, because the information collection 10 in FIG. 2A is dynamic and changes with time, i.e., is date-sensitive, there may be multiple versions (or instances) of a part $S_i$ and $S_{i+/-1}$ of the common subject, which will occur when that part changes one or more times. The notation $S_{i,j}$ is used to denote a $j^{th}$ version of an $i^{th}$ section of the particular part. Each information unit 14 is preferably distinct and has temporal information associated therewith indicating its temporal applicability, i.e., for the period of time (temporal status) that the part included in each information unit 14 is applicable (as may be indicated by the value of the j index). Each information unit is unique by virtue of its content or the temporal information associated therewith, or both.

Figure 2B:
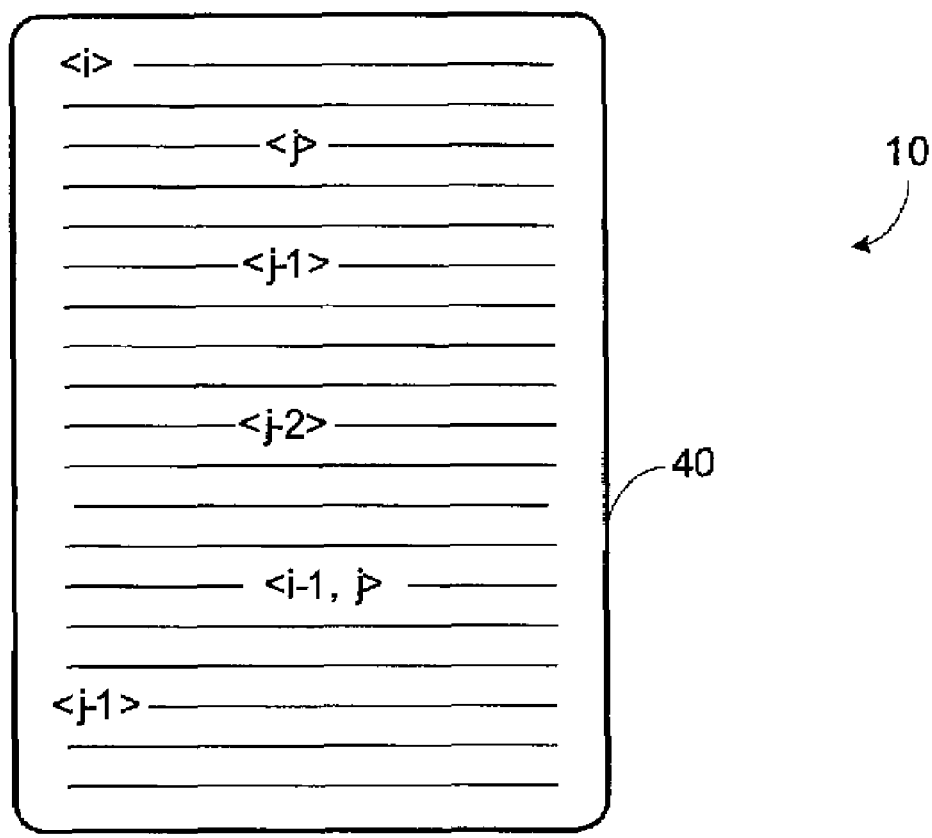

The information units 14 need not be physically distinct, e.g., stored in separate files or even different records or fields of a database, as long as temporal information is associated with the information unit. FIG. 2B depicts a representation of a portion of such an embodiment of an information collection 10, where the "<>" symbols represent an embedded markup language used to format a file or document 40, where i and j denote the information described above. The format represented in FIG. 2B provides an alternate way of organizing a subject into unique, identifiable information units or parts. The applicable information units or parts of the subject for a given date can then be displayed using the embedded information, filtering and/or selection techniques. For example, with respect to the U.S. code body of law, the state of any section of the U.S. Code, or a higher level overview of one or more titles, or the U.S. Code itself, as it existed on any given date may be displayed.

Figure 2C:
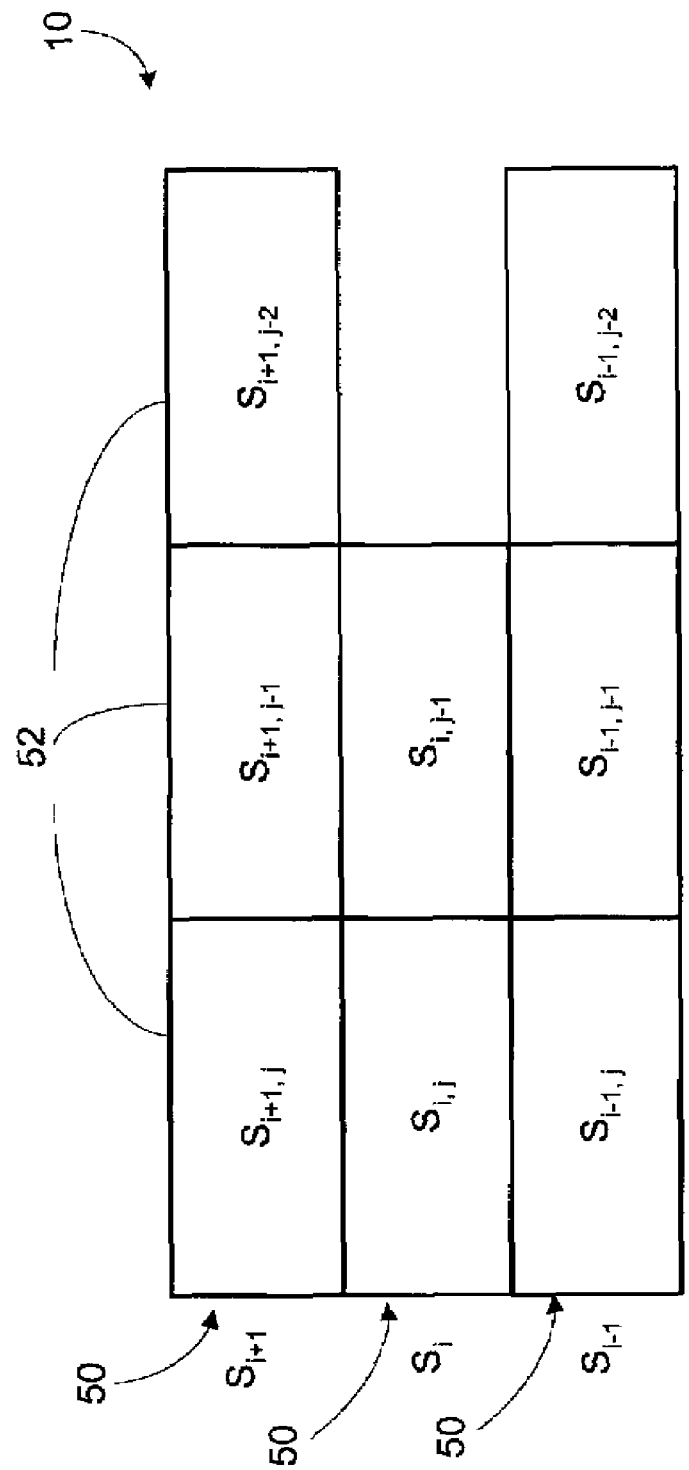
FIG. 2C is a schematic diagram illustrating data having temporal information associated therewith arranged in a relational database structure according to the invention.

In another embodiment represented in FIG. 2C, an information collection 10 is provided by a relational database that stores a body of information on a common subject. In this embodiment, each record 50 may be the equivalent of a topical unit or node in a topic tree and represent a distinct part of the subject (e.g., a section of the U.S. Code), and each field 52 may hold a different version or instance of that part of the subject. Thus, the $S_{i,j}$ notation discussed above applies to FIG. 2C. In another embodiment, a record may represent an information unit and include the content of a part of the common subject, the associated temporal information and other information of the type described herein.

Preferably, however, a construct such as a data structure is provided to embody the topic tree and forms an integral part of the information collection. This conveniently allows the topic tree to be displayed to a user and employed as an aid in navigating through the information base.

Figure 3:
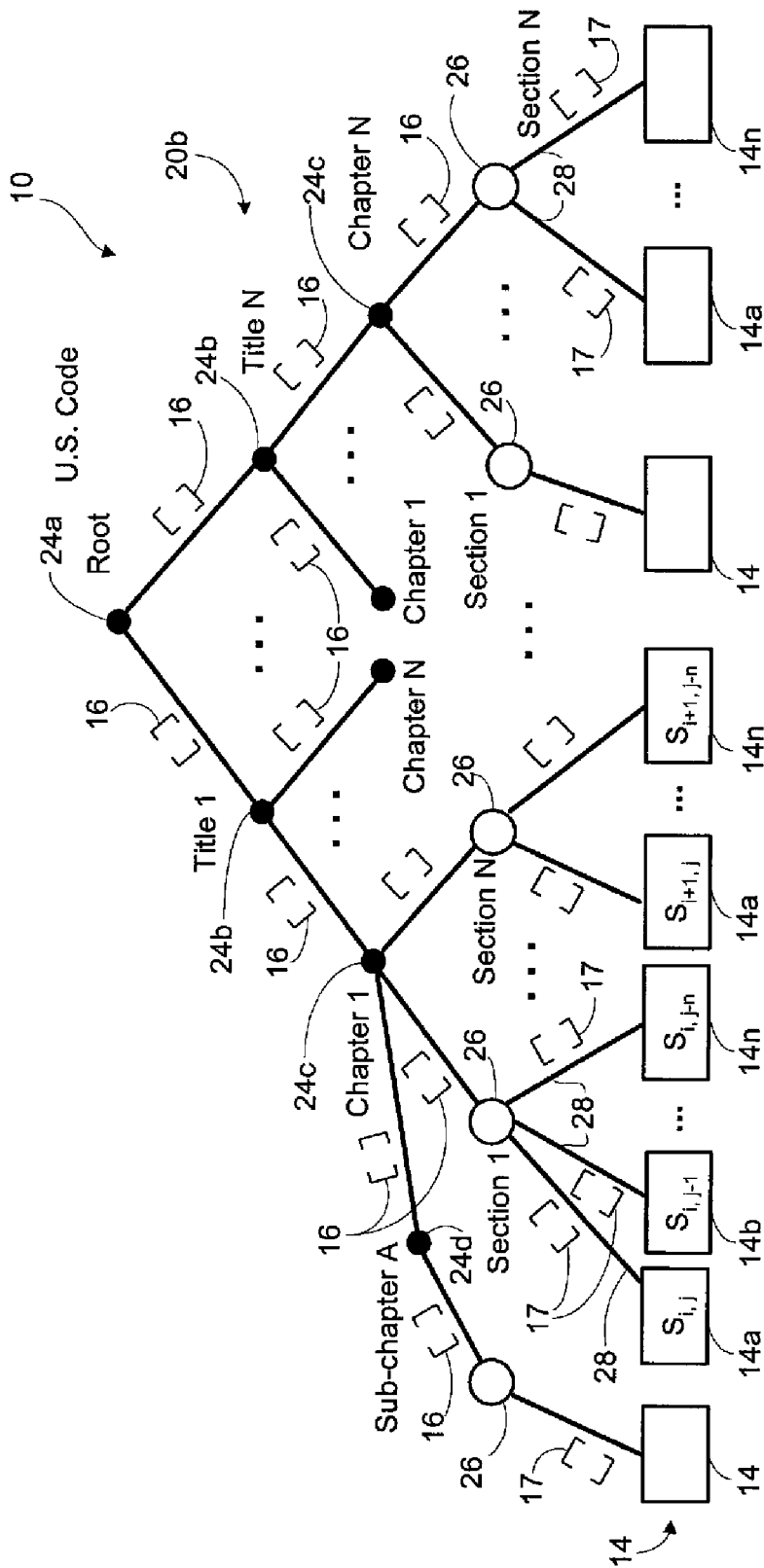
FIG. 3 is a schematic diagram illustrating data arranged in a hierarchical tree structure, similar to that depicted in FIG. 1, into which the United States Code and other bodies of law or information collections can be arranged in accordance with the invention.

One embodiment of the invention is a legal information collection or database in the form of a body of law comprising the U.S. Code. For example, as shown in FIG. 3, a topic tree 20b for an information collection 10 defining the U.S. Code may be constructed using a hierarchy comprising: a root (or "starting point") node 24a, Title nodes 24b, Chapter nodes 24c, Subchapter nodes 24d, etc., and Section nodes 26 of the U.S. Code. In this case, the atomic topical unit 26 is a section of code, and the leaf nodes 26 point to the information unit or units 14 which store the text of each version or instance of a section of the code. For example, using the notation discussed above in connection with FIG. 2A, $S_i$ and $S_{i+/-1}$ denote an ith, and ith+/-1 sections of the Code, and $S_{i,j}$ is used to denote a jth version of an ith section of the particular section of the Code.

Unless the context indicates otherwise, the term "section" of code is used to denote a numbered portion of the code without reference to changes in the text thereof. A version of a section of code, (sometimes referred to as a "unit of code"), has temporal information associated therewith that provides a temporal aspect to the particular version which thereby represents a section of code as it reads on a particular date or range of dates.

Information collection 10 represented in FIG. 3 associates temporal information not only with the information units 14 thereof but also with nodes 24 (except the root node 24a) and nodes 26 of the topic tree. Each information unit 14 and node 24b, 24c, 24d and 26 in FIG. 3 is associated with temporal information 16 or 17 indicating the applicability thereof with respect to time. Thus, in information collection 10 represented in FIG. 3, the visibility of the nodes (except root node 24a) and information units 14 of the topic tree 20b is dependent upon the associated temporal information, and can be accessed based on a date or time period encompassed in the temporal information. These nodes may be associated with names, labels or headings of an indexing or classification system which are displayable for the purposes of navigation, thus making the indexing or classification system also date-sensitive. In FIG. 3, these labels represent or are instances of the names of the titles, chapters and sections of the U.S. Code.

In practice, a topic tree for the U.S. Code is not balanced or symmetrical as generally illustrated in FIG. 3, and would comprise a non-uniform hierarchy because the codification is in fact more complex than shown in FIG. 3.

In FIGS. 1-3, the temporal applicability of a part of the body of information or an information unit 14 or topical unit 24, 26 is preferably denoted by a date range. Unless the context indicates otherwise, the term "date range" is meant in a broad sense and encompasses any scheme or system which allows the temporal applicability of a part of a body of information defining a common subject, or an information unit or topical unit to be determined. For example, with reference to temporal information associated with information units 14, a date range can be explicitly denoted by two dates, t1 and t2, or implicitly denoted by one date, t3, which indicates that the information unit can be visible from time t3 to present. A scheme can also be set up in which information units that are related in a pre-defined manner are each associated with a single date, whereby a date range can be inferred from a difference between successive information units. For instance, information units 14A and 14B in FIG. 1, which are associated with the same topical unit 26, can have sequence numbers indicating their temporal order. If unit 14B has date t4, and unit 14A has date t5, t5>t4, then the temporal applicability of unit 14B can be inferred as t4 to t5 and the temporal applicability of unit 14A is t5 to present.

Furthermore, unless the context indicates otherwise, the term "date" is meant in a broad sense and encompasses not only calendar days, but additionally or alternatively, time, and vice verse. For example, unless the context indicates otherwise, "date" can be real as "time" to allow for distinguishing one part of a day from another. For example, 12:00 PM EST on Apr. 10, 2001 is consistent with the term "date" as meant herein.

Figure 4:
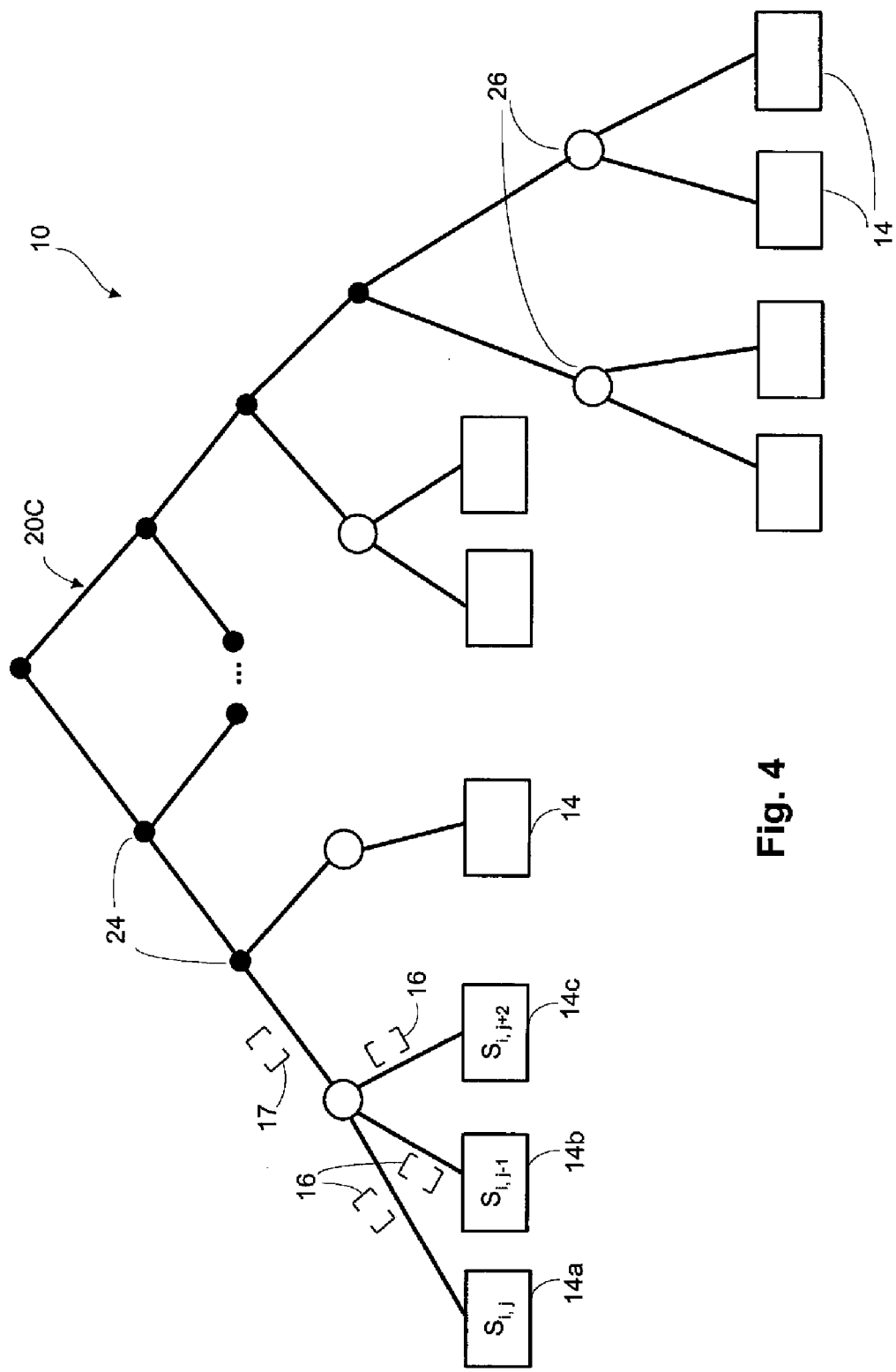
FIG. 4 is a schematic diagram illustrating data arranged in a hierarchical tree structure, similar to that depicted in FIG. 1, where, however, not all of the data has temporal information associated therewith.

Portions of an information collection can be temporarily static or portions of a topic tree can be temporally static, i.e., not have any temporal information associated therewith, as shown, for example, in the information collection 10 represented in FIG. 4. In the topic tree 20C depicted in FIG. 4, only the information units 14a, b, c are associated with temporal information 16.

In the foregoing embodiments, the information units 14 preferably comprise textual information, including associated temporal applicability information. However, in alternative embodiments, the information units may omit temporal applicability information. In that case, the information units are associated with separate temporal applicability information not included in the information units, for example by links, pointers, etc. Information units may additionally or alternatively include, or be associated with, other types of data such as graphical, audio and/or video data. Further, an information unit can itself comprise a combination of another or other information units. Techniques for associating, encapsulating, linking, pointing to, etc., data and information in various programming languages are known to those having ordinary skill in the programming arts.

United States Code Database System

The Database

Figure 5:
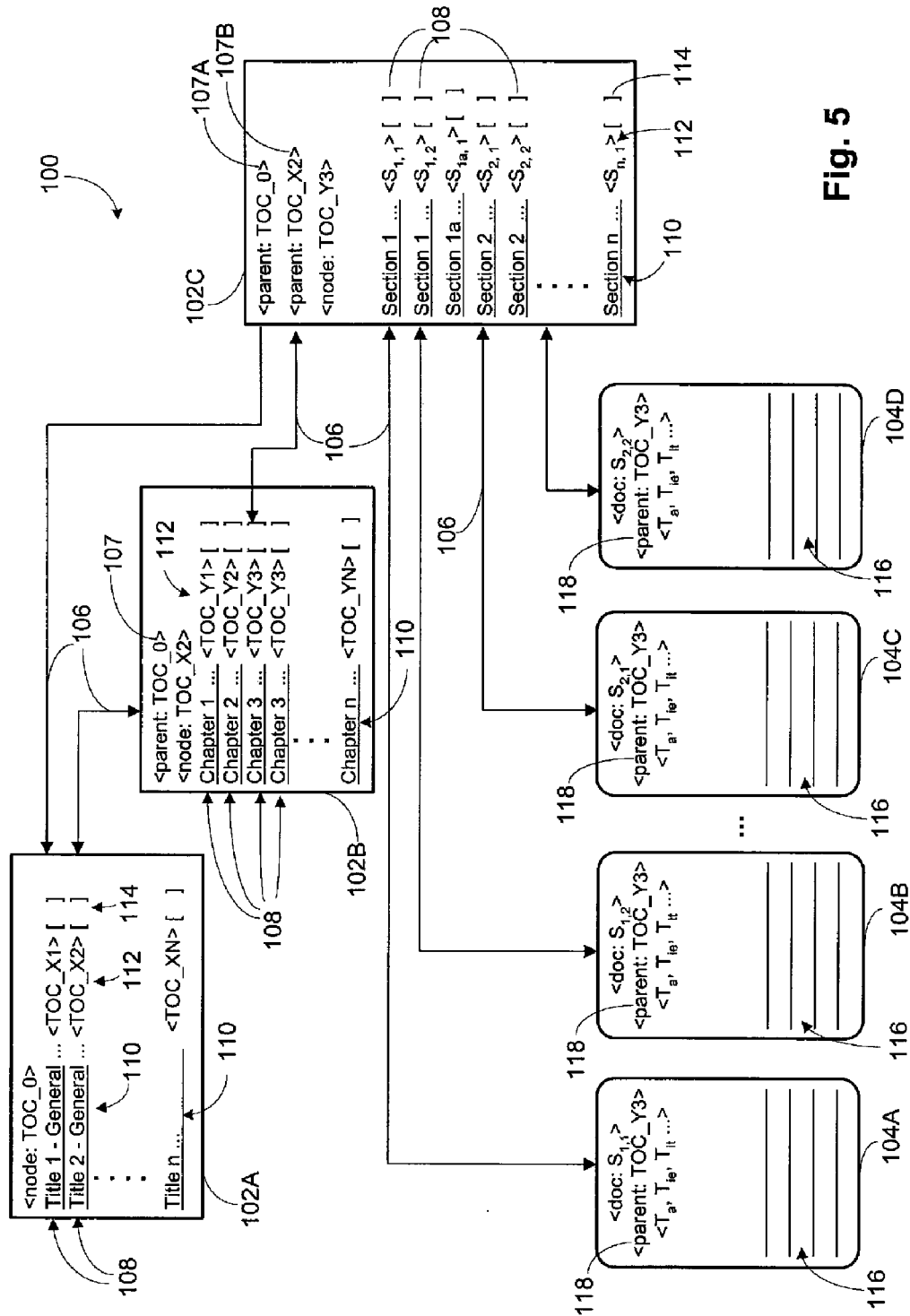
FIG. 5 is a schematic diagram illustrating a document structure into which the United Sates Code or other body of law or information collection can be arranged in accordance with the invention.

As mentioned, in one embodiment of the invention, the subject is a body of law, such as the U.S. Code. FIG. 5 illustrates a preferred embodiment of a data or document architecture of the U.S. Code database 100. The database 100 comprises two kinds of documents: table of contents (TOC) documents 102 (which collectively include documents 102A, 102B ... ), and subject matter documents 104. In a topical tree embodiment, the TOC documents 102 embody nodes 24, 26, for example as described above, and the subject matter documents 104 (which collectively include 104A, 104B ... ) embody subject matter or information units 14, for example, as described above, which in this embodiment comprise units of the U.S. Code.

The TOC documents 102 are organized in a hierarchy. Except for a root TOC document 102A, each TOC document 102 includes a file reference 107 that specifies at least a parent TOC document 102 from which the former depends or descends. In addition, each TOC document includes a document reference 108 to each child document directly dependent therefrom, which can be a child TOC document 102 or a subject matter document 104. (The dependencies are schematically illustrated in FIG. 5 by lines 106.) The hierarchical structure is logically similar to the topic tree depicted in FIG. 3 with the exception that, in practice, titles and/or chapters of U.S. Code are sometimes further sub-divided into a hierarchy of parts or sub-chapters so that the topic tree is not balanced and is more complex. Nevertheless, the topical unit 26 in this embodiment remains a section of the U.S. Code, and the subject matter units 14 are versions or instances of the respective section of the U.S. code.

As shown in FIG. 5, each TOC document 102 includes references to all lineal ancestors and descendants in the topic tree. For example, the TOC document 102C shown in FIG. 5 includes not only document reference 107B to parent TOC document 102B (a higher level document) and document reference 107A to the grandparent TOC document 102A (another higher level document), but also references 108 to child or descendant documents 104A, B, C, D (lower level documents). This enables the complete hierarchical path of the TOC document 102C to be readily displayed, as discussed below.

In the preferred embodiment, a legal database 100 is implemented through the use of structured documents created with a markup language such as XML. XML tags are used to delineate or differentiate between references to ancestral documents and references to descendant documents.

In the preferred embodiment, each document reference 108 (FIG. 5) in a TOC document 102 comprises or is associated with the following data elements, which are distinguished by XML tags:

A label 110 that provides a name for display during navigation by a user through the topic tree or TOC structure. The label name preferably accurately reflects the substance of the referenced TOC or subject matter document. In the preferred embodiment, each label is a heading (or instance thereof) in the table of contents to the U.S. Code. For example, if the referenced document relates to section 78g of Title 15 (i.e., 15 U.S.C. §78g) as of Sep. 21, 2001, the label is "Sec. 78g. Margin requirements." The label is preferably appropriately tagged (not shown) in XML (and/or HTML prior to being interpreted by a browser) so as to enable the browser to display the name as an actuatable hypertext link.

A filename 112 that specifies the location of the referenced TOC document or subject matter document in the database 100. If desired, a URL (universal resource locator) may be employed, for example, where the documents 102 or 104 are located across a network. The symbols "<>" schematically indicate in FIG. 5 that the bracketed information, such as the filename 112, comprises or consists of non-displayable control information.

Date parameters 114 that specify the temporal scope or applicability of the referenced TOC documents 102 or subject matter documents 104. For TOC documents disposed at leaf nodes of the topic tree, the date parameters are those described below with reference to subject matter documents 104. A less extensive set of date parameters may be employed for TOC documents logically positioned at a hierarchically higher level of the topic tree.

The hierarchy of TOC documents 102 in FIG. 5 represents the table of contents of the U.S. Code, as it evolves over time. Consequently, headings of the table of contents are organized in a multi-level hierarchy in which each heading, other than an atomic heading representing a topical unit, is associated with at least one descendant or dependent child heading.

Each subject matter document 104 (FIG. 5) includes, or references, or represents a version j of a section $S_i$ of the U.S. Code. In the preferred embodiment, subject matter documents 104 include the following elements, distinguished by XML tags:

The text 116 of $S_{i,j}$ for display purposes. The text 116 may include a differentially marked format where available, as discussed below. The text can also include congressional or legislative notes about the law for explanatory purposes, as well as a reference to the public law that gave birth to the section. This additional material is preferably tagged and displayed on request, as discussed below.

A document reference 118 to the parent TOC document 102C, which represents a topical unit. Document references 118 incorporate data elements 110-114 as previously described.

An adoption date ("$T_a$") representing the date on which the section, or more generally, the law or regulation enacting the section, is adopted, enacted or passed. In this sense, $T_a$ matches the law or regulation enacting a section to the section. The adoption date is also used to order versions or instances of the same section of law. For example, $S_{i,j+1}$ adopted on Jan. 10, 1970 would replace $S_{i,j}$ adopted on Jan. 1, 1960. The adoption date can be before, during, or after the effective temporal range of a section of law.

An initial effective date ("$T_{ie}$") representing the date on which the section will or does first take effect. This date may differ from the adoption date, $T_a$, of that section and may also be contingent on an event whose date is not certain on the adoption date.

An initial termination date ("$T_{it}$") representing the last date on which the section will be effective as determined on the adoption date, $T_a$. $T_{it}$ will usually be "infinity", i.e., in perpetuity, or indefinite. Like the initial effective date, $T_{ie}$, the initial termination date $T_{it}$ may also be contingent or uncertain.

A final effective date ("$T_{fe}$") representing the first date on which the section is in force as a result of a new law or regulation. Subsequent to the adoption date $T_a$ of a section $S_{i,j}$, a new law or regulation may be passed that causes the section to be in force for a time other than an initial effective interval, e.g., between the initial effective date, $T_{ie}$, and the initial termination date, $T_{it}$. The "final effective date", $T_{fe}$, may differ from the initial effective date, $T_{ie}$.

A final termination date ($T_{ft}$) representing the last day on which a section is in force as a result of passage of a new law or regulation. Generally, this date is different from the initial effective date, $T_{ie}$, but does not necessarily need to be.

The foregoing date information provides a mechanism for determining the temporal applicability of a given section of the U.S. Code, as well as maintaining historical information that may be useful to researchers. An example of this is shown in FIGS. 6A-6C. FIG. 6A illustrates the situation when a section, $S_{i,j}$, of the U.S. Code is first passed or first entered into the database 100. As is typical, the public law causing $S_{i,j}$ to come into existence is adopted on a particular date $t_0$ and states that $S_{i,j}$ will become effective at a later date $t_1$, and remain in effect indefinitely, i.e., the initial and final termination dates $T_{it}$ and $T_{ft}$, are indefinite, infinity or in perpetuity. Hence, $T_a=t_0$, $T_{ie}=t_1$, $T_{fe}=t_1$, $T_{it}=\infty$, and $T_{ft}=\infty$, and the date range associated with $S_{i,j}$ is $T_{fe}$ to $T_{ft}$ or $t_1$ to $\infty$.

In FIG. 6B, another law is adopted at time $t_2$ (represented by $S_{i,j+1}$ in the lower time line), which, when it becomes effective at time $t_3$, causes a change to the text of $S_{i,j}$. A new document is created, represented in lower time line of FIG. 6B by $S_{i,j+1}$, which can be a modification of the original document represented by $S_{i,j}$ in the upper time line of FIG. 6B. In this case, the subject matter document including $S_{i,j}$, should be modified so that $T_{ft}=t_3$. The time periods $T_{fe}$ and $T_{ft}$ indicate when a law is in force and thus the applicability of $S_{i,j}$ is marked as being only between $t_1$ and $t_3$. The new subject matter document is represented by $S_{i,j+1}$. In this new document, $T_a=t_2$, $T_{ie}=t_3$, $T_{fe}=t_3$, $T_{it}=\infty$, and $T_{ft}$ the date range associated with $S_{i,j+1}$ is $t_3$ to $\infty$.

Time $t_3$ indicates both the time the old law (represented in the upper time line of FIG. 6B by $S_{i,j}$) terminates and the time that the new law (represented in the lower time line of FIG. 6B by $S_{i,j+1}$) is effective. In the database 100, the final termination time $t_{ft}$ will be represented by $T_3\_1$ (not shown in FIG. 6B), which is a time just before $T_3$, i.e., "1" represents a fictitious or actual unit of time. This precludes the possibility of the database 100 indicating that the new and the old law are simultaneously effective. For example, $T_3$ may be 12:01 AM and $T_3\_1$ may be 12:00 midnight of the previous day. Thus, for example, the applicability of $S_{i,j}$ ends at 12:00 midnight of December 31 and the applicability of $S_{i,j+1}$ starts at 12:01 AM of January 1.

In FIG. 6C, another law is adopted at time $t_4$ which becomes effective at time $t_5$ and again modifies the text of this section (i.e., $S_{i,j+1}$ is modified). As a result, $S_{i,j+1}$ is modified so that $T_{ft}=t_5-1$ ("1" is a unit of time as discussed above), and $S_{i,j+2}$ is created with $T_a=t_4$, $T_{ie}=t_5$, $T_{fe}=t_5$, $T_{it}=\infty$, and $T_{ft}=\infty$.

In certain cases, the text of the section of code is stored in the subject matter document 104 using a differentially-marked format (e.g., a so-called redline version), so that when displayed shows the changes in section. For example, referring to FIG. 6B, the text of the code section in $S_{i,j+1}$ preferably the includes the text of the code section of $S_{i,j}$ but marked up with pre-specified XML tags in order to indicate unchanged text, additional text and deleted text. This enables a browser, for example, to display changes to the section if so desired by a user, as discussed below. If desired, the historical date information, $T_{ie}$ and $T_{if}$, may be displayed at the same time in order to indicate the temporal applicability of the previous version or instance of that section of the Code.

Appendix 1 is a truncated sample of an XML document for 3 U.S.C. §102. "Truncated (#1)" represents additional historical information. "Truncated (#2)" represents the remainder of the concerned amendment. "Truncated (#3)" represents additional references to related public law sections. "Truncated (#4)" represents additional annotations. The text of 3 U.S.C. §102 is presented in a differential format, where "$200,000" would be displayed stricken and "$400,000" underlined.

Appendix 2 is a truncated sample of an XML document for a TOC of Title 3, United States Code. "Truncated (#1)" represents additional chapter designations.

"Truncated (#2)" represents the text of additional chapter headings. "Truncated (#3)" represents additional annotations.

The sample XML documents in Appendices 1 and 2 include historical information, related public law information and annotational information in addition to temporal information.

The System

Figure 7:
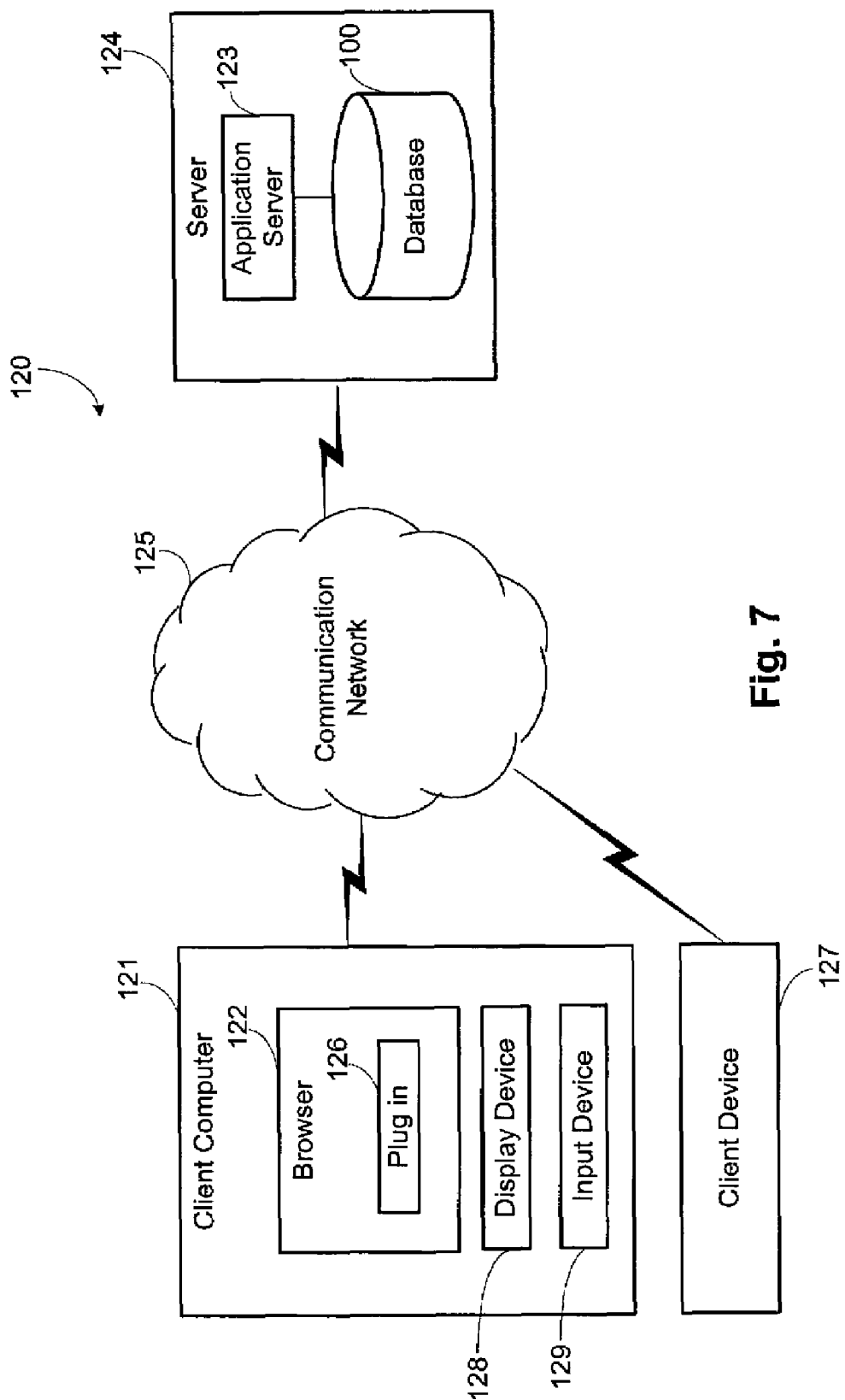
FIG. 7 is a block diagram of a system according to the invention in which the United States Code body of law represented in FIG. 5 is stored, accessed, retrieved and displayed in accordance with the invention.

FIG. 7 depicts one embodiment of a hardware and software system 120 employed for accessing an information collection, base or database 10, 100 of the type described herein. The system 120 includes a client computer 121 and a server computer 124 coupled through a communications network 125. The server computer includes or is coupled to an information base or database 100. The client computer 121 includes a computer display device 129 (e.g., a monitor) on which information retrieved from the information base and other information can be displayed, and an input device 128 (e.g., a keyboard and/or pointer or cursor control device such as a mouse) by which requests and queries and other information can be input to the system 120. The terms "computer" and "devices" are meant herein in a broad sense and, unless the context indicates otherwise, encompass PCs, MACs, PDAs, cell phones, lap tops, palm tops, handhelds, etc. The terms "request" and "query" are used in a broad sense as described above.

System 120 depicts a client-server system that includes client computers (e.g., PC's, PDAs, etc.) 121 that include a user interface 122, which in the preferred embodiments includes some type of browser software 122. For example, client computer 121 can include an MS Windows-based client application that interprets and forwards input from an input device 129 to the server 124. Alternatively, an Internet-type browser can provide the entire user interface in client computer 121. However, other types of systems and user interfaces may be used, as will be known to those having ordinary skill in the computer and programming arts.

In the preferred embodiment for implementing a system involving the U.S. Code, a database 100 of data files or documents marked up using one of the many markup or formatting languages or specifications, as known in the art per se, is provided. The markup is used to embed customized control or formatting information in the document. The documents are preferably stored in the database 100 accessible with an application server 123. The database 100 and the application server 123 may be part of, or coupled to, the server computer 124. The server computer 124 provides documents for delivery over the communications network 125, which may be a private network or a public network such as the Internet, to client computers 121.

In the preferred embodiment, the documents are stored in the database 100 in XML format and rendered into HTML by the application server 123 for distribution to client computers 121 that execute browser software 122. However, the documents may be delivered in XML format to client computers 121 having a plug-in or other such interpreters 126 in order to interpret the XML specification. Other kinds of markup languages may also be employed in practice, and other types of client devices 127 may be used. Furthermore, the database 100 could be stored on a CD-ROM or the like and directly accessed by client computers 121 or other devices 127. In all of these embodiments, it will be understood that the database 100 is stored on a computer readable medium which is operatively connected to a computer or to a computer system, comprising one or more processors, devices or computers, which controls storage, access, retrieval and/or display, or otherwise the visibility of information from the database 100.

Figure 8:
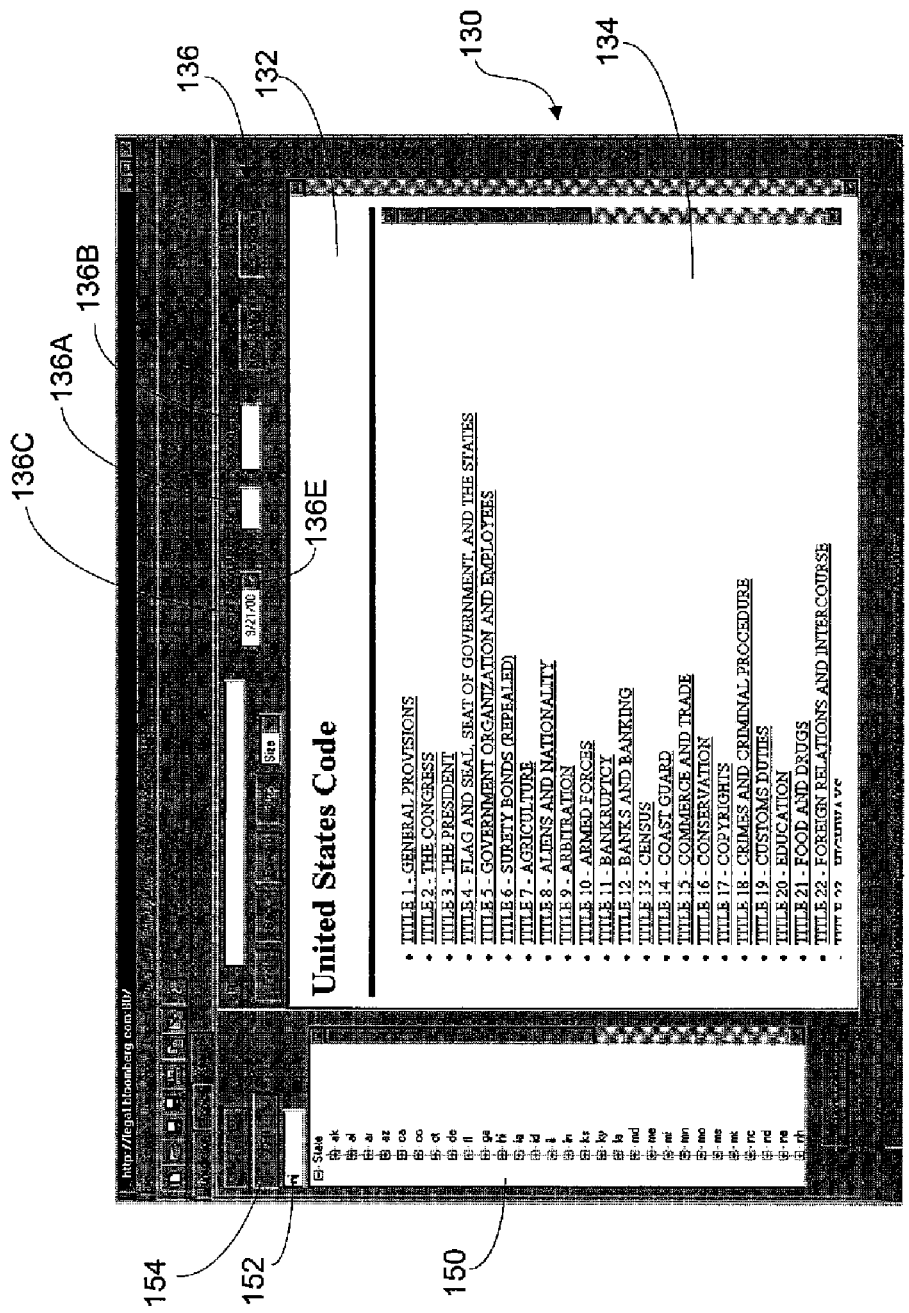
FIGS. 8-15 illustrate various screen displays of data from the United States Code body of law represented in FIG. 5, and menu selections in FIGS. 8-14 for other bodies of law provided by the system depicted in FIG. 7.

FIGS. 8-14 show screens provided by the user interface 122, which includes an MS Windows-based client application that includes browser software, on a computer display device 128 included in or coupled to a client computer 121. FIG. 8 shows a welcoming screen 130 of the U.S. Code information database 100 displayed by the browser 122 when it first connects to the server 124. The main components of the browser user interface comprise a navigational window 132, a display window 134, and a search toolbar 136.

The navigational window 134 (FIGS. 8-10) generally displays the user's current position within the codification structure, i.e., the hierarchical path that the user has navigated through in the topic tree. In this case, the navigational window displays headings in the table of contents to the U.S. Code as shown in FIG. 8. As previously described, these headings and links to the corresponding documents are conveniently stored within each TOC document.

Figure 9:
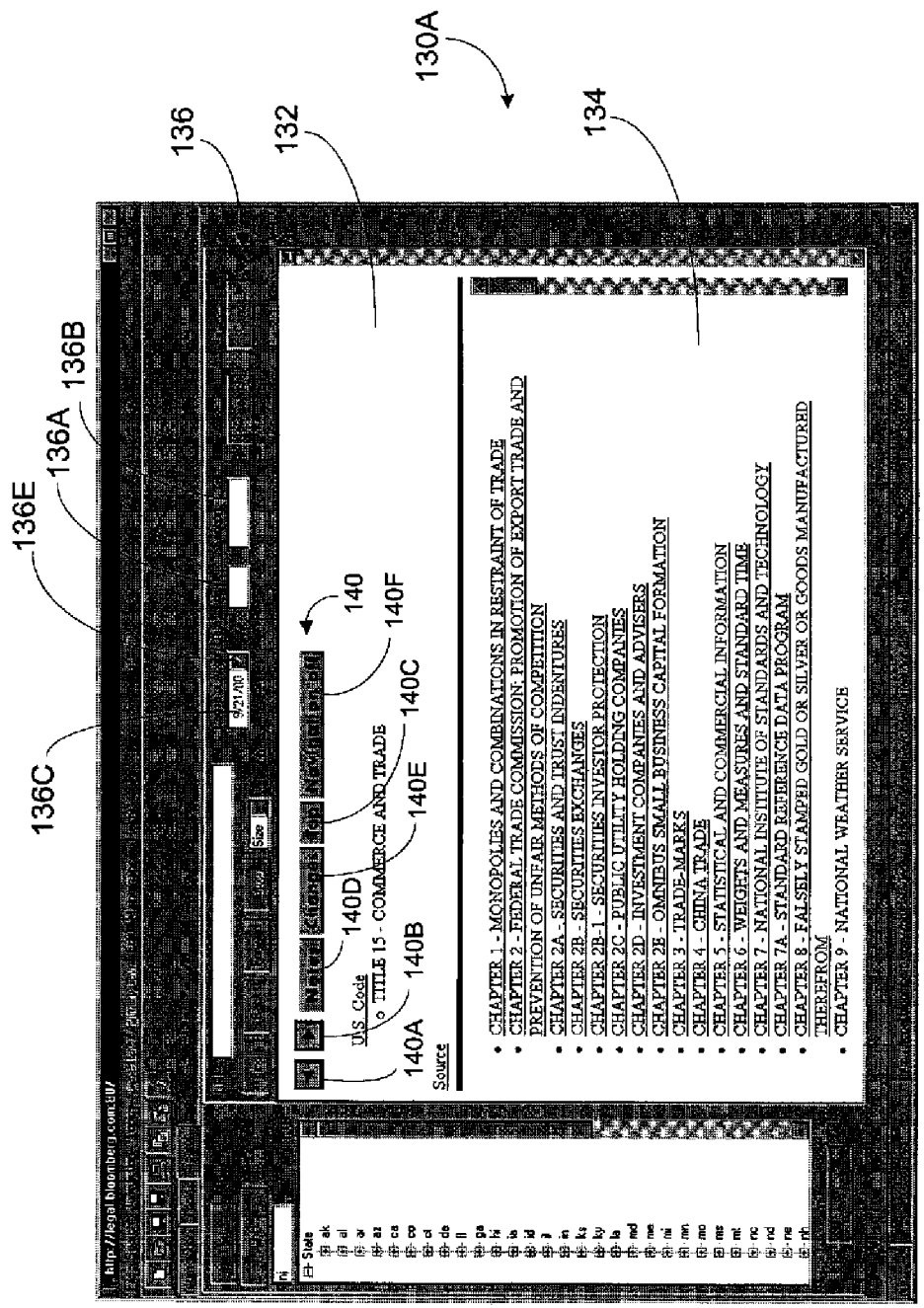
Figure 10:
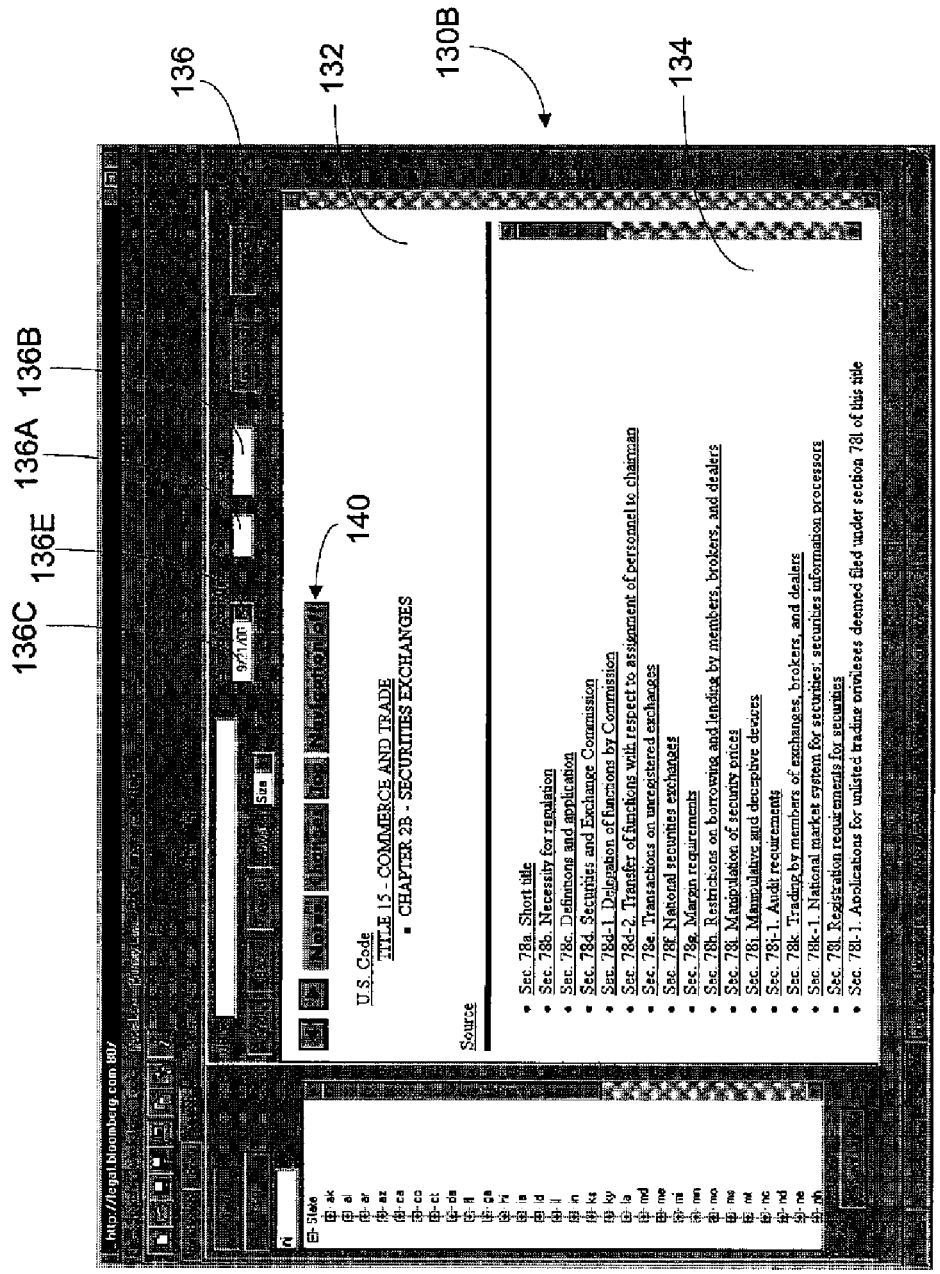
Figure 11:
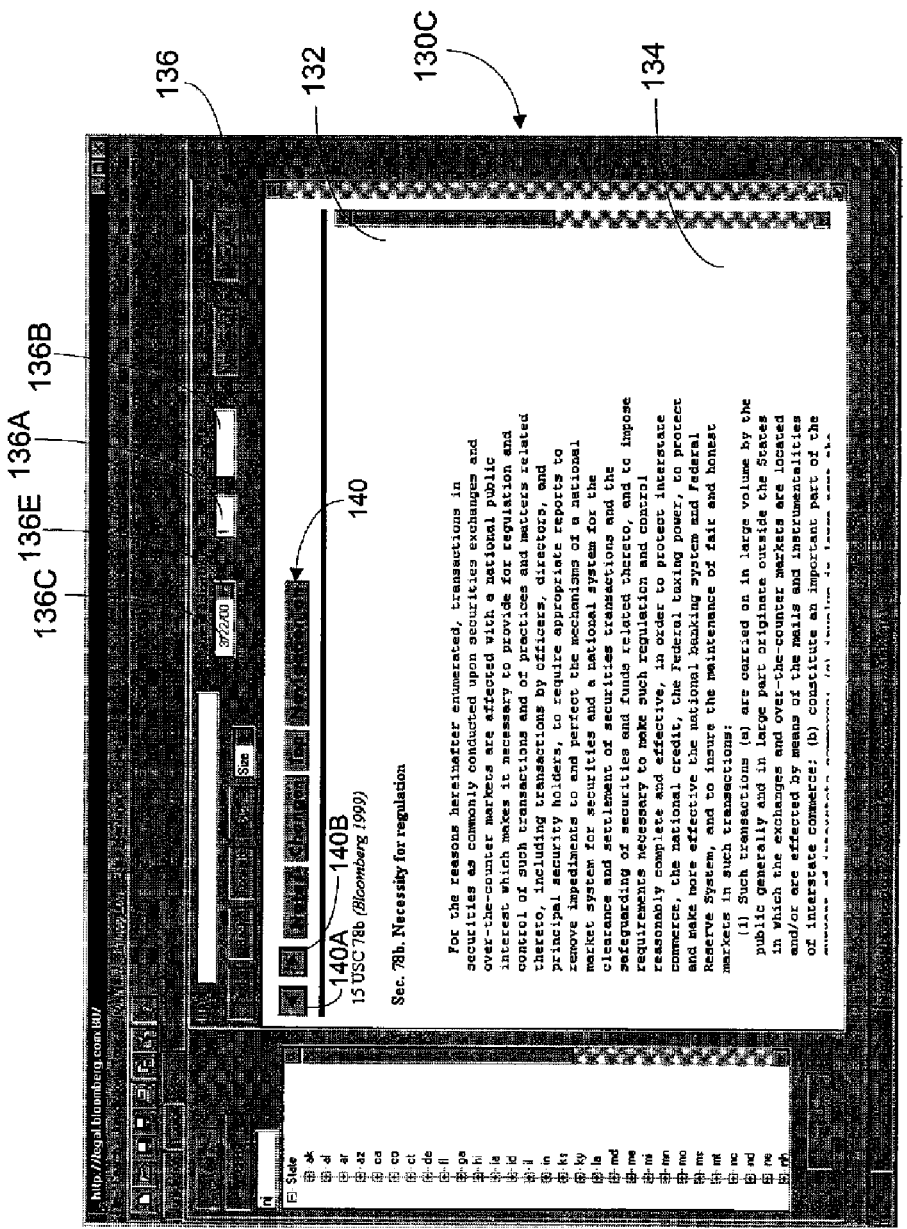

The display window 134 in FIGS. 8-10 is generally used to display the nodes or branches of the topic tree that the user may select to continue navigation through the tree. In the event a leaf node/topical unit is reached, the display window 134 in FIGS. 11-14 displays the dependent subject matter document. Thus, the display window 134 displays either the organizational or classification structure of the U.S. Code, as represented by the table of contents, or the sectional text.

The search toolbar 136 (FIG. 8) provides input fields 136A and 136B for direct navigation via citation searches by title (136A) and section (136B). The toolbar 136 also includes a date input field, specifically a "cause of action" input field 136C, for specifying the visibility or displayability of TOC labels, headings or links in the navigational or display windows 132 and 134 and subject matter documents displayed in display window 134. For example, the TOC document 102C in FIG. 5 includes references to two "Section 1" subject matter documents 104A and 104B. Depending on the date entered in the cause of action field 136C, only one "Section 1" link will be displayed in the navigation window 132 and only one subject matter document will be displayed in the display window 134. If no date is entered, the cause of action date 136C defaults to the current date.

In alternative embodiments, rather than having a single "cause of action" date, it may be desirable to be able to receive a range of dates as an input parameter. In such embodiments, all subject matter documents and TOC references/labels which fit the specified date range are visible. This enables the researcher to have ready access to the provisions of the Code over a range of time.

In forming the welcoming screen 130 (FIG. 8), the browser 122 loads a TOC document 102A (FIG. 5) from the server 124 and displays all the titles of the U.S. Code applicable as of the cause of action date input in field 136C. By pointing and clicking, the researcher can select a particular title of the Code and begin to navigate through the topical tree inherent in the TOC documents 102. This enables a researcher to quickly move into an area of law of interest.

If a particular title of the Code is selected or otherwise actuated, the browser 122 retrieves and loads the appropriate TOC document 102B (FIG. 5) from the server 124. FIG. 9 depicts a screen 130A displayed when the user has selected Title 15 of the United States Code, which results in the chapters of Title 15 being displayed in the display window 134, and the hierarchical path through the table of contents being displayed in the navigation window 132. The server 124 also causes an optional navigational toolbar 140 to be displayed in the navigational window 132. This toolbar 140 includes virtual buttons 140A and 140B for moving forward and backward along the currently displayed hierarchical level of the topic tree or table of contents. For example, actuating the forward button 140B results in the chapters of Title 16 being loaded and displayed. The "top" virtual button 140C scrolls up to the top of the material shown in the display window 132. The "notes" virtual button 140D provides the user with additional congressional or legislative information concerning the law, this information being stored in the TOC or subject matter document as described above. The "changes" virtual button 140E provides the user with a differential-format text display as discussed below in connection with FIG. 14. The "navigation off" virtual button 140F removes the navigational window 124 from the screen display thereby increasing the size of the display window 134, if desired.

A user can jump or navigate to any of the nodes displayed in windows 132 and 134. The navigational process may continue until the user reaches a leaf node in the topical tree, represented in screen 130B in FIG. 10, where the sections of Chapter 2B, Title 15 of the U.S. Code are displayed. The hierarchical path through the table of contents is displayed in the navigational window 132 as stored in TOC document 102C loaded by the browser 122. Optionally, this information (hierarchical path) can be constructed by following the TOC links up the tree in the case where the complete hierarchical path is not stored in the TOC documents. From the screen 130B depicted in FIG. 10, the user may select one of the displayed sections to view the corresponding date-filtered section of the Code, such as Section 78b shown in screen 130C in FIG. 11. At this point, pressing the forward or reverse virtual buttons 140A or 140B will cause the browser 122 to load and display the date-filtered subject matter documents 104 (FIG. 5) for Section 78c or Section 78a, respectively.

Figure 12:
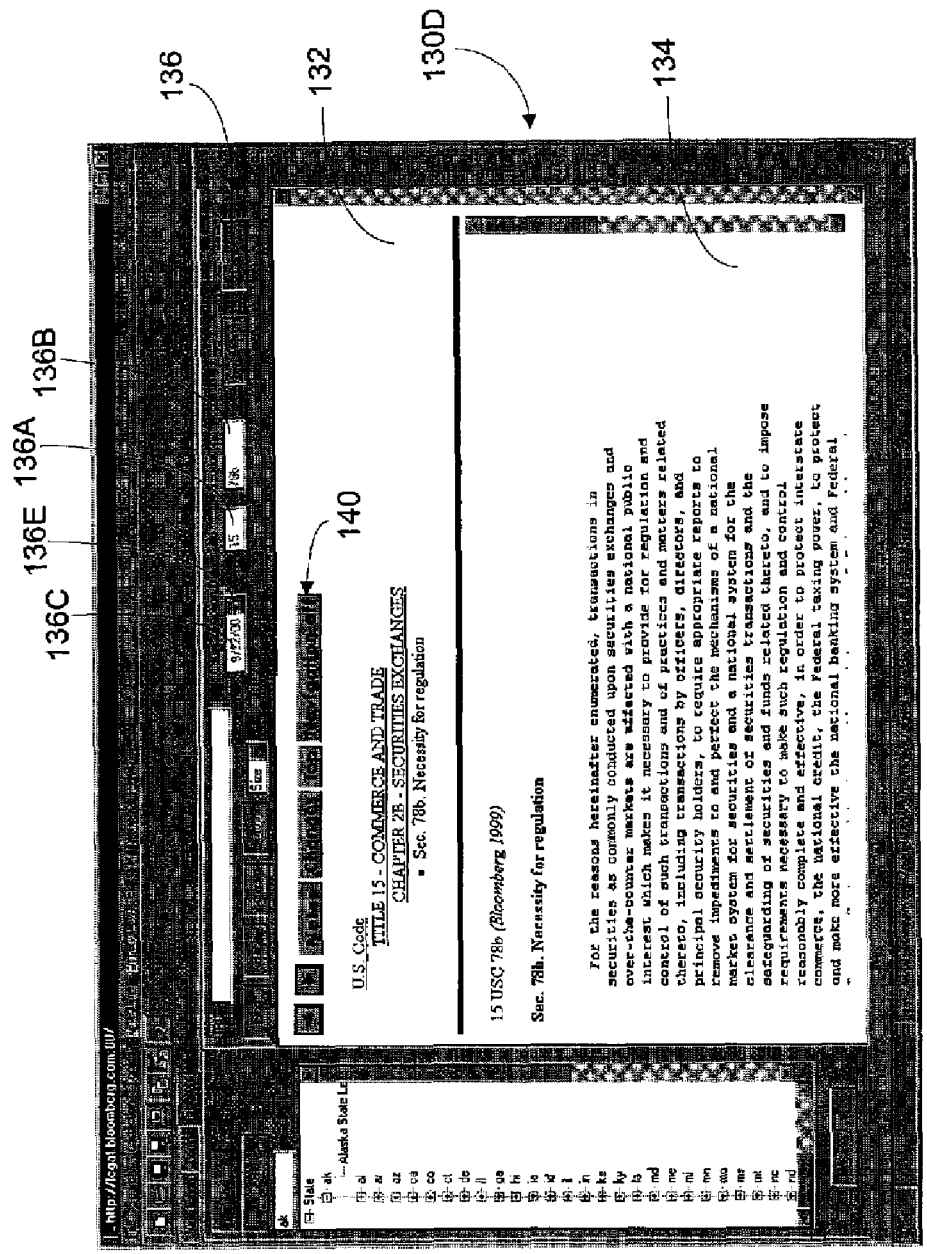
Figure 13:
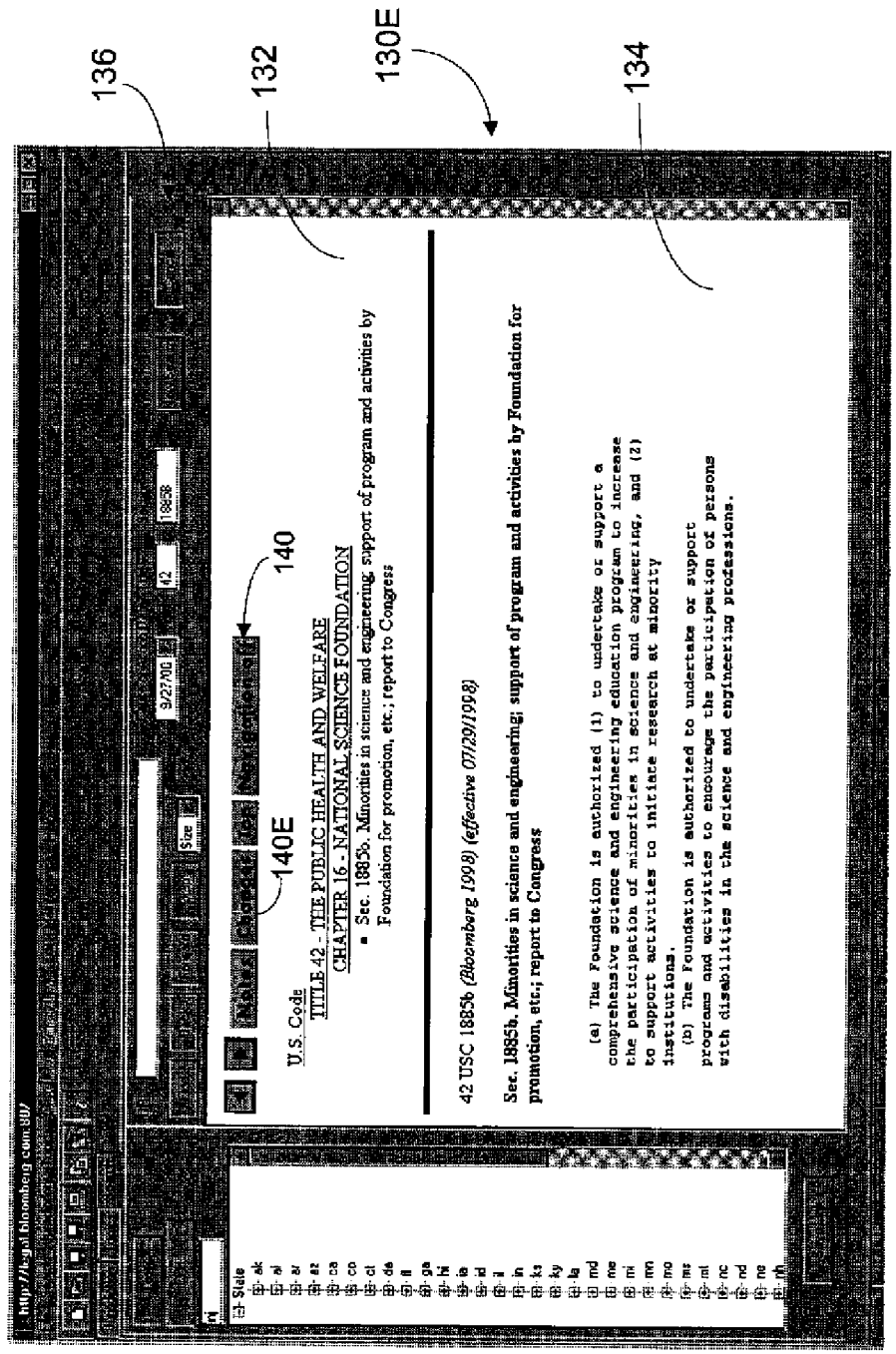

In addition, the search toolbar 136 (FIG. 11) may be used to go directly to a section of the U.S. Code by means of a citation search. Each section of law in the U.S. Code is uniquely citable by title and section identifiers, which are entered in input fields 136A and 136C. FIG. 12 shows a screen 130D when the citation for 15 USC §78b has been entered into input fields 136A and 136C. Carrying out such a search, the browser 122 passes the title and section identifiers to the server 124, and the server 124, in turn, preferably executes an index search to find the requested subject matter document 104 (FIG. 5) or alternatively traverses through the topical tree implemented by the TOC documents 102 until it finds the leaf TOC document 102C which points to the requested subject matter document 104, which document is then communicated to and loaded by the browser software.

The search toolbar 136 (FIG. 9) can also be used to enter the material from a temporal perspective. An arrow icon 136E may be used to change the "cause of action" date appearing in a box 136C.

In addition to the navigation and citation searches mentioned above, the preferred embodiments enable word and field searches (user interface not shown in FIGS. 8-14), as known in the art. Furthermore, a "historical" search is preferably also available (user interface not shown in FIGS. 8-14), in which the entire database 100 is visible to the user, i.e., and parts thereof can be selected and displayed.

The screens depicted in FIGS. 8-14 were rendered by a client computer 121 (see FIG. 7) that includes an MS Windows-based user interface and Internet browser software 122 for interpreting html documents. Input commands entered into the client computer 121 by the input device 129 (e.g., a mouse and/or keyboard) are interpreted and passed to the server 124 for execution. The server 124 returns responsive html or XML documents that are interpreted by the browser software 122 or the XML plug-in 126.

Alternatively, a browser 122, such as MS Internet Explorer, may be used by the client computer 121 as the user interface. In this embodiment, the server 124 is a net server, and the client software is an Internet browser which provides all user interface controls and interprets html documents returned by the net server 124.

Figure 15:
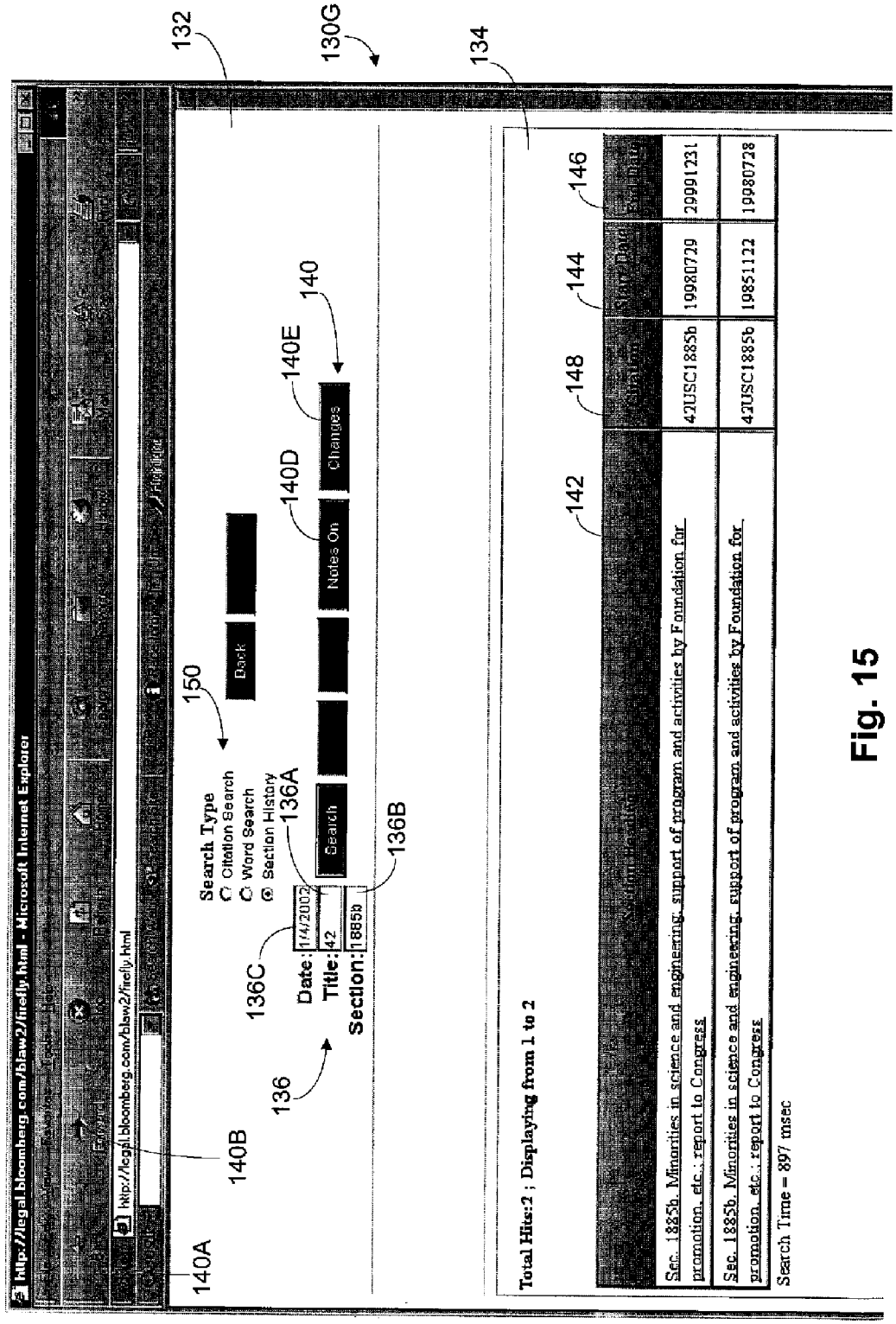

FIG. 15 depicts a screen 130G rendered by an Internet browser for a "Section History" search request including a title number ("42") entered in the title field 136A and a section number ("1885b") entered in the Section field 136B. The current date (Jan. 4, 2002) appears in gray tone in the date field 136G. The server 124 returns a table 140 having section headings 140 for all atomic versions of the section (Section 1885b) entered into the section field 136B and the associated start and end dates 144 and 146 for the section versions represented by the displayed headings 140. A researcher can then view and select the particular version that is of interest to him or her. In response to a selection of a particular heading, the server 124 returns the version represented by the selected heading in a screen display similar to that shown in FIG. 13.

The browser user interface represented by the screen depicted in FIG. 15 and the windows-based user interface represented by the screens depicted in FIGS. 8-14 include basically the same user controls, as indicated by the use of corresponding reference numbers in the different screens. In addition, the browser user interface includes a "Search Type" selection menu 150, which enables a researcher to select among a "Citation Search" (as generally represented by the screens depicted in FIGS. 8-14), a "Word Search" which allows searching by keywords, and a "Section History" search as represented by the screen depicted in FIG. 15. Programming for configuring the database 100 for word searches and for conducting word searches is known in the art and therefore will not be described herein.

Figure 14:
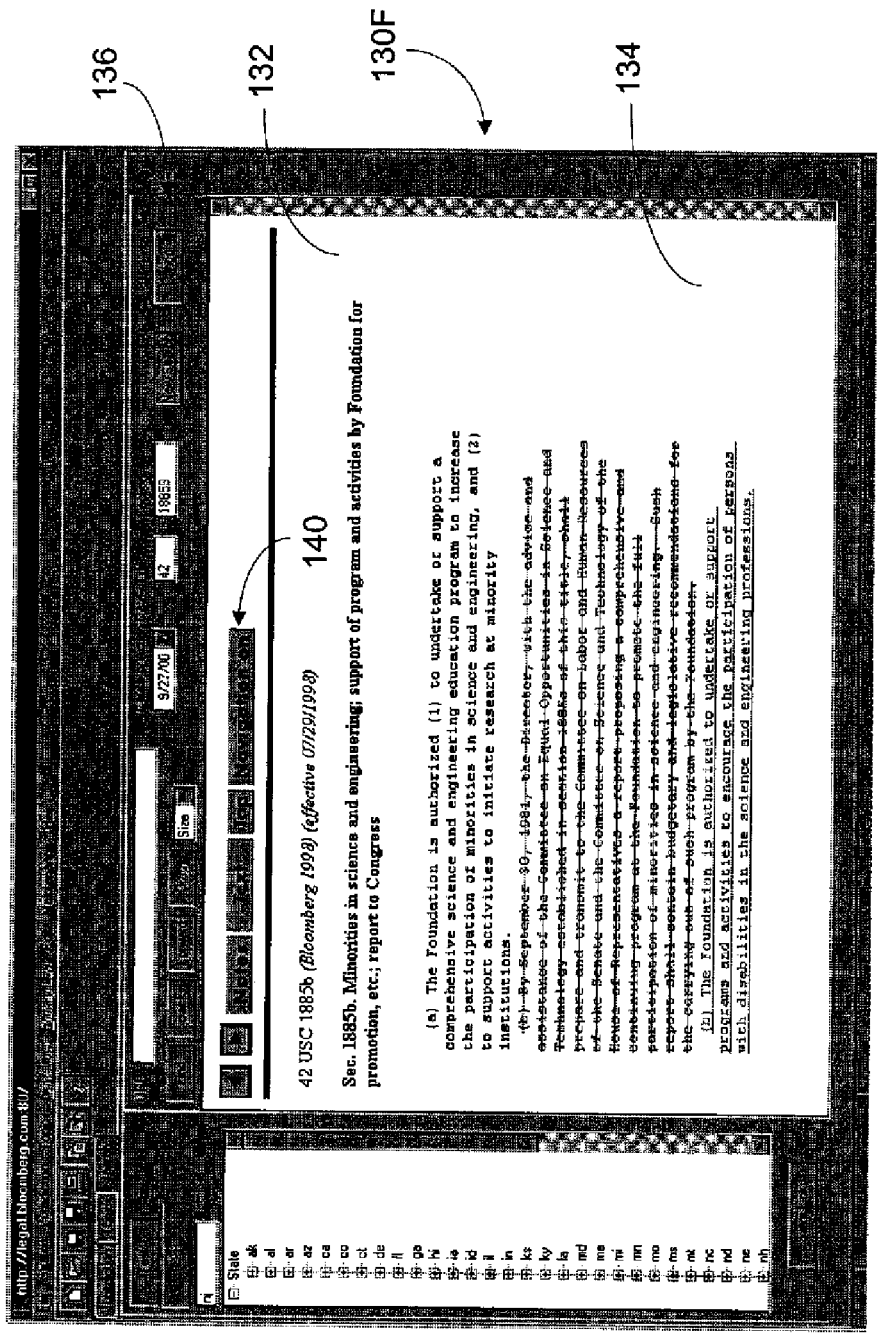

As previously noted the "changes" virtual button 140E (FIG. 9) allows the user to view a differential text display that shows how the law was last modified, if applicable. For example, in screen 130E shown in FIG. 13, the text was retrieved by a citation search, for 42 USC §1885b, effective as of Sep. 27, 2000. This version of the law went into effect on Jul. 29, 1998. FIG. 14 shows the screen 130F that arises from activating the "changes" function 140E on the navigational toolbar 140 of the screen 130E in FIG. 13. Unchanged text is preferably shown in a regular black-colored font; deleted text in a stricken-through font and in another color, e.g., red; and new text in an underlined font in still another color, e.g., green. From this display, the researcher can piece together the 'old law' or the law prior to the new effective date, by reading the black text in conjunction with the red text. In addition the researcher can read the new law by reading the black text in conjunction with the green text. Lastly the researcher can easily compare the two laws by readily seeing the differences as displayed within the one screen, thus providing a convenient format of benefit to the researcher. From a technical point of view the differential display is relatively easy to generate because, as previously described, the changes to the law are tagged and stored within the subject matter document 104, as discussed below.

Given the description of the structure of the TOC and subject matters documents in conjunction with the user interface, the programming of an application server, which is the software component of the server responsive to browser requests, will be readily apparent to those skilled in the programming arts.

The legal database 100 has been described in connection with the U.S. Code. However, the database 100 may include bodies of state and federal law, the U.S. Code of Federal Regulations ("C.F.R."), bodies of administrative laws (or regulations), etc., in lieu of or in addition to the U.S. Code. In a preferred embodiment, database 100 includes state codifications and the U.S. C.F.R. Implementation for these bodies of law will be apparent to those of skill in the relevant arts from the disclosure herein.

The screens represented in FIGS. 8-14 show a user interface for state law codifications and the U.S. C.F.R. Referring to FIG. 8, a navigation window 150 at the left of the screen 130A includes those states whose body or bodies of laws are included in the database 100. Next to the two letter abbreviation for each state is a selectable link that navigates to the body of state law. Selecting one of these links will lead to a screen similar to screen 130 showing a table of contents for that state's laws. A TOC screen for a state's body of law may also be obtained by inputting the state's two letter code into box 152. Similarly, a table of contents screen for the U.S. C.F.R. can be obtained by selecting the CFR button 154. Further navigation and use for state laws and the U.S. C.F.R. is similar to that described above for the U.S. Code.

Procedures for maintaining the database 100 include accounting for modifications to existing sections of law, inserting new sections of law, and repealing or omitting existing sections of law. Additional requirements include transferring sections of law, amending the notes to a section, renumbering a section and re-enacting a section. Similarly, it may be necessary to insert a new entry into the table of contents (TOC), renumber a TOC entry, transfer a TOC entry, and repeal a TOC entry. A maintenance program provides these functions.

Figure 16:
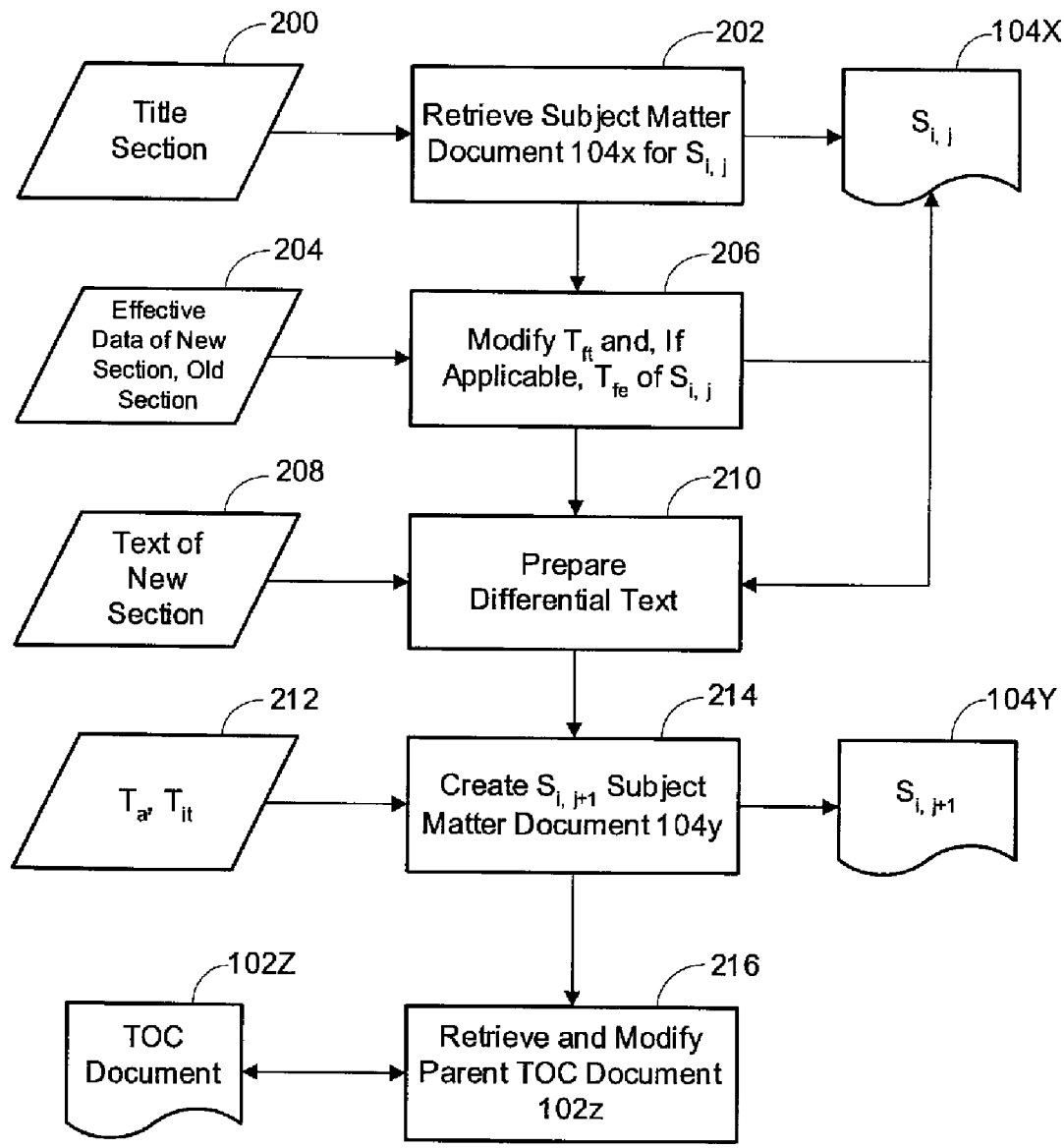
FIG. 16 is a flowchart of a process for updating a body of law, such as the United States Code represented in FIG. 5, when an existing part thereof is modified.

FIG. 16 shows the processing steps that can be used to modify an existing section of the Code (or other body of law) represented by the database 100. To start the process, the operator identifies the affected section $S_{i,j}$ by its citation, step 200. This enables the server to retrieve the corresponding subject matter document 104X for section $S_{i,j}$, at step 202. At step 204 the operator provides the effective date $T_{ie}$ of the modified section, i.e., the date the modified section $S_{i,j+1}$ will go into force. At step 206 the server then modifies $T_{ft}$ and, if applicable, $T_{fe}$, of the original section, $S_{i,j+1}$. Typically, but not always, $T_{ft}$ (of $S_{i,j}$) is changed to $T_{ie}(S_{i,j+1})-1$, i.e., the $T_{ie}$ of $S_{i,j+1}$ minus a unit of time as necessary. For example, the old section terminates at 12:00 midnight of one day and the new section takes effect at 12:01 a.m. of the next day, in which case the 1 unit of time is one minute and the termination date and the new effective date are on successive days. At step 208, the text of the modified section $S_{i,j+1}$ is entered into the system. At step 210 the new text of the modified section $S_{i,j+1}$ is compared (for example, in a manual operation) with the text of the original section $S_{i,j}$ in order to generate an XML-tagged differential text document.

At step 214, the subject matter document 104Y is created for the modified section $S_{i,j+1}$ by incorporating the differential text produced in step 210 and any congressional or legislative notes provided in step 212, and gives the document a filename using a predetermined nomenclature. During step 214, the subject matter document 104X representing $S_{i,j}$ is parsed to extract the document reference 113 (see FIG. 5) to its parent TOC document 102Z, which will also own subject matter document 104Y including the modified section. This extracted document reference is written into document 104Y. In addition, the various date elements are written into the document 104Y. Specifically, $T_{ie}(S_{i,j+1})$ for the original document is set to the starting date of the amended section, and $T_{fe}(S_{i,j+1})$ is set to equal $T_{ie}(S_{i,j+1})_j-1$. $T_a(S_{i,j+1})$ is set to the date on which the law or regulation which created $S_{i,j+1}$ was enacted. $T_{ie}(S_{i,j+1})$ is set to the ending date, typically perpetuity, of the amended section, and $T_{fe}(S_{i,j+1})$ is set to $T_{ie}(S_{i,j+1})$.

At step 216, the server retrieves the TOC document 102Z that will own section $S_{i,j+1}$. The parent TOC document 102Z is then modified to incorporate a new reference 108 (see FIG. 5) to subject matter document 104Y representing $S_{i,j+1}$. This includes the foregoing date parameters which enable the label 110 for $Si,j+1$ to be appropriately date-filtered. At this point $S_{i,j+1}$ has been fully integrated into the information base.

When a new section of the Code arises, the process of incorporating that section into the database 100 is similar to that described with reference to FIG. 15. In this case, a new subject matter document 104 is created without comparison to a pre-existing subject matter document, and the parent TOC document 102Z is updated to include a reference to the new subject matter document. In the event the new section(s) is created within the framework of a new chapter, part or title of law, one or more new TOC documents will be created and other TOC documents may have to be modified in order to incorporate references to the new TOC documents.

A repeal or omission of a section of the Code requires an update to the parent TOC document owning the subject matter document corresponding to that section. More particularly, the date range of the reference to the subject matter document in the TOC document is modified to update the final termination date, $T_{ft}$.

A transfer of the text of a first section of the Code to a second section of the Code is treated as a repeal of the first section and a modification to the second section.

Similar procedures may be followed in modifying, inserting, deleting or repealing TOC entries.

In the flowchart of FIG. 16, the input steps 200, 204, 208 and 212 have been shown and described as separate and manually provisioned input steps. However, those skilled in the art will appreciate that the input data can be input from a data feed or electronically from a computer readable medium, as discussed below. Also, input data can be provided in one step and the process repeatedly executed in batch mode.

It is also possible to capture some of the information required to update the information base 100 by parsing data files produced by the Office of the Law Revision Counsel. For example, FIG. 17 shows a table 250 of classifications for the U.S. Code produced by the Office of the Law Revision Counsel, U.S. House of Representatives, and made available over the Internet. The table describes the affected section of the U.S. Code and the nature of the change, e.g., new section, transfer of section, repeal or omission of section, or, by default, modification of the section. The public law that caused the section to change is listed, as well as a reference to the Statutes at Large. The public law sets out the new text of the section, and the date the public law is passed represents the date of adoption of the new section. A citation to the public law is preferably included within the subject matter document 104 so that a hyperlink reference can be provided to the public law. This type of class function may or may not be available for state or other bodies of law, and various sources may have to be examined to obtain the information needed to update the body of law.

Variants and Modifications

The legal database 100 described above can be readily adapted for other bodies of law, in this or other countries. Also, the hierarchy may be extended to incorporate subsections or paragraphs. For example, Title 37, Part 2, Section 51 of the C.F.R. (i.e., 37 C.F.R. §2.51) is divided into subsections (a) and (b) which each are further sub-divided into sub-sub sections (1), (2) and (3). In general, those of skill in the art will appropriately define atomic units of the subject or body of law and will form the information or subject matter units and topical units in the most practical manner. This will depend to some degree upon the expected extent of modifications to the subject or body of law, as well as how much of a part of the subject or body of law should be shown in one display screen to provide clear, cohesive and/or unencumbered displays to the researcher with sufficient context to avoid "getting lost" during navigation.

Further, different or additional user interface screens may be provided. For example, a drop down date version of a list may be provided for a section or section heading that is displayed. Selection of a date of interest would result in display of the section version associated with the selected date. The date list may be populated from a central repository rather than from discrete structured documents.

The foregoing embodiments have described in detail an information collection defining a body of law, e.g., the U.S. Code. It should be understood that the invention is applicable to other bodies of information and subjects, and application of the invention thereto would be apparent to those skill in the relevant arts from the disclosure herein.

Also, although a preferred embodiment of the U.S. Code database described above employs structured documents, other schemes may be used for the U.S. Code database and other information collections. Where structured documents are employed, they can be structured using any suitable markup language, and in other ways, or using non-structured documents such as records in a relational database. Also, those skilled in the art will understand that a variety of programming methodologies can be used to implement a hierarchical information collection, base or database. Similarly, those skilled in the art will appreciate that numerous modifications and variations may be made to the embodiments described herein without departing from the spirit and scope of the invention.

APPENDIX 1

SAMPLE XML DOCUMENT (TRUNCATED) FOR TITLE 3, UNITED STATES CODE, SECTION 102

```
<USCODE>
    <WHOWASI[SF1]>03/03_26</WHOWASI>
    <TOCFILE[SF2]>TocUSCTITLE3CHAPTER2</TOCFILE>
    <DATE[SF3]
    >01/05/1999</DATE>
 - <ASENACTED[SF4]>
      <FILENAME[SF5]>3USC102_20010120_a[SF6]</FILENAME>
      <PL[SF7]> Pub.L. 106-58, Sec. 644(a) </PL>
      <DATESTATUS[SF8] >Enacted? = Effective</DATESTATUS>
      <DATE_ENACTED>01/20/2001</DATE_ENACTED>
      <DATE_EFFECTIVE[SF9]> 01/20/2001</DATE_EFFECTIVE>
      <UNCERTAIN[SF10]>the first show of
      the season</UNCERTAIN>
      <DATE_TERMINAL[SF11]>12/31/2999</DATE_TERMINAL>
   </ASENACTED>
 - <ASAMENDEDI[SF12]>
      <FILENAME[SF13]>3USC102_20010120_a</FILENAME>
      <PL> Pub.L. 106-58, Sec. 644(a) </PL>
      <DATESTATUS>Enacted? = Effective</DATESTATUS>
      <DATE_ENACTED>01/20/2001</DATE_ENACTED>
      <DATE EFFECTIVE[SF14]>01/20/2001</DATE EFFECTIVE>
      <DATE.TERMINAL>12/31/2999</DATE_TERMINAL>
   </ASAMENDED>
   <AMENDEDBY[SF15]/>
 - <LEGISLATIVE_HISTORY>
   - <HISTORICAL[SF16]>
      <FILENAME>3USC102_19780102_a</FILENAME>
      <PL>Pub. L. 95-570, Sec. 5(a)</PL>
      <DATESTATUS>Effective? = Enacted </DATESTATUS>
      <DATE_ENACTED>1/2/1978</DATE_ENACTED>
      <DATE_EFFECTIVE>1/2/1978</DATE_EFFECTIVE>
      <DATE_TERMINAL>01/19/2001</DATE_TERMINAL>
   </HISTORICAL>
 </LEGISLATIVE_HISTORY>
 <NAME[SF17]>Sec. 102. Compensation of the President</NAME>
 - <RULE>
   - <STATUTE[SF18] xml:space="preserve">
     The President shall receive in full for his services
     during the term for which he shall have been
     elected compensation in the aggregate amount of
   - <S>
        <STRIKE>$200,000</STRIKE>
     </S>
     <SPACE />
     <U>$400,000</U>
     a year, to be paid monthly, and in addition an expense
     allowance of $50,000 to assist in defraying expenses
     relating to or resulting from the discharge of his official
     l duties, for which expense allowance no accounting,
     other than for income tax purposes, shall be made by
     him. He shall be entitled also to the use of the
     furniture and other effects belonging to the United
     States and kept in the Executive Residence at the
     White House.
   </STATUTE>
 - <EXTRA>
   - <SOURCE xml:space="preserve">
     - <HIST_LIST[SF19]>
       - <HIST ITEM>
            <HIST_DATE_ENACTED>June 25,
            1948</HIST_DATE_ENACTED>
          ' <HIST_SECTION>ch.644</HIST_SECTION>
          ' <HIST_STATUTE>62 Stat.
            678</HIST_STATUTE>
         </HIST_ITEM>
         ;
                    TRUNCATED (#1)
    </HIST_ITEM_LAST>
```

APPENDIX 1-continued

SAMPLE XML DOCUMENT (TRUNCATED) FOR TITLE 3, UNITED STATES CODE, SECTION 102

```
 - <HIST_ITEM LAST>
      <HIST_PL[SF20]>Pub. L. 106-58,
      Sec. 644(a,b)</HIST_PL>
      '<HIST_DATE_ENACTED[SF21]>Sept. 29,
1999</HIST_DATE_ENACTED>
      '<HIST_STATUTE[SF22]>113 Stat.
      478</HIST_STATUTE>
   </HIST_ITEM_LAST>
      .
    </HIST_LIST>
  </SOURCE>
 - <MISC1[SF23] xml:space="preserve">
    AMENDMENTS 1978 - Pub. L. 95-570 substituted
    "Executive Residence at the White House" for
    "Executive Mansion". 1969 - Pub. L. 91-1
    substituted "$200,000" for "$100,000". 1951 -
    Act Oct.
                   TRUNCATED (#2)
 - <PUBLIC_LAW>
      <PUBLIC_LINK[SF24]>publ277.105.txt</PUBLIC_LINK>
      Pub. L. 105-277
   </PUBLIC_LAW>
    , div. A, title I, Sec. 101(h) (title III), Oct. 21, 1998,
    112 Stat. 2681-480, 2681-492.
    - <PUBLIC_LAW>
         <PUBLIC_LINK>publ61.105.txt</PUBLIC_LINK>
         Pub. L. 105-61
      </PUBLIC_LAW>
      , title III, Oct. 10, 1997, 111 Stat. 1290.
    - PUBLIC_LAW>
         <PUBLIC_LINK>publ208.304.txt</PUBLIC_LINK>
         Pub. L. 104-208
      </PUBLIC_LAW>
      , div. A, title I, Sec. 101(f) (title III), Sept. 30,
      1996, 110 Stat. 3009-314, 3009-326.
    - PUBLIC_LAW>
         <PUBLIC_LINK>pub152.104.txt</PUBLIC_LINK>
         Pub. L. 104-52
      </PUBLIC_LAW>
      , title III, Nov. 19, 1995, 109 Stat. 477. Pub. L. 103-
      329, title III, Sept. 30, 1994, 108 Stat. 2392. Pub.
                  TRUNCATED (#3)
   </EXTRA>
 </RULE>
 - <ANNOTATION type="findings[SF25]">
   - <PUBLIC_LAW PIECE>
      <PL_SESSION/>
      <PL_LAW />
      <PL_SECTION />
    </PUBLIC_LAW_PIECE>
    <ADOPTED_DATE/>
    <EFFECTIVE_DATE/>
    <TERMINATION_DATE>12/31/2999</TERMINATION_DATE>
    <TEXT/>
   </ANNOTATION>
 - <ANNOTATION type="appropriations[SF26]">
   - <PUBLIC_LAW_PIECE>
      <PL_SESSION/>
      <PL_LAW />
      <PL_SECTION />
    </PUBLIC_LAW_PIECE>
    <ADOPTED_DATE/>
    <EFFECTIVE_DATE/>
    <TERMINATION_DATE>12/31/2999</TERMINATION_DATE>
    <TEXT />
   </ANNOTATION>
 - <ANNOTATION type="popularName[SF27]">

<PUBLIC_LAW_PIEC
      E>
         <PL_SESSION/>
         <PL_LAW />
         <PL_SECTION />
      </PUBLIC_LAW_PIECE>
```

APPENDIX 1-continued

SAMPLE XML DOCUMENT (TRUNCATED)
FOR TITLE 3, UNITED STATES CODE, SECTION 102

```
    <ADOPTED_DATE/>
    <EFFECTIVE_DATE/>
    <TERMINATION_DATE>12/31/2999</TERMINATION_DATE>
    <TEXT />
  </ANNOTATION>
- <ANNOTATION type="effective Date[SF28]">
  - <PUBLIC LAW PIECE>
      <PL_SESSION />
      <PL_LAW />
      <PL_SECTION />
    </PUBLIC_LAW_PIECE>
    <ADOPTED_DATE/>
    <EFFECTIVE_DATE/>
    <TERMINATION_DATE>12/31/2999</TERMINATION_DATE>
                TRUNCATED (#4)
```

SAMPLE XM DOCUMENT (TRUNCATED)
FOR TOC OF TITLE 2, UNITED STATES CODE

```
<?xml version+'1.0'?> <!DOCTYPE USTOC SYSTEM './../common/
ustoc.dtd'> <USTOC>
<WHOWASI>02/02 1</WHOWASI>
<TOCFILE?toc/title00/TocUSC</TOCFILE>
<HIERARCHY>
<TOCENTRY>
<NAME>U.S.Code</NAME>
<PL> </PL>
<DATESTATUS>Effective?=Enacted</DATESTATUS>
<DATE_ENACTED>01/05/1999</DATE_ENACTED>
<DATE_EFECTIVE>01/05/1999</DATE_EFECTIVE>
<DATE_TERMINAL>12/31/2999<DATE_TERMINAL>
<WHOAMI>toc/titlle00/TocUSC</WHOAMI>
</TOCENTRY>
<TOCENTRY>
<NAME>TITLE 2 - THE CONGRESS </NAME>
<PL> </PL>
<DATESTATUS>Effective?=Enacted</DATESTATUS>
<DATE_ENACTED>01/05/1999</DATE_ENACTED>
<DATE_EFECTIVE>01/05/1999</DATE_EFFECTIVE>
<DATE_TERMINAL>12/31/2999</DATE_TERMINAL>
<WHOAMI>toc/title02//TocUSCTit02</WHOAMI>
</TOCENTRY>
</HIERARCHY>
<CHILDREN>
<TOCENTRY>
<NAME>CHAPTER 1 - ELECTION OF SENATORS
AND REPRESENTATIVES</NAME>
<PL> </PL>
<DATESTATUS>Effective?=Enacted</DATESTATUS>
<DATE_ENACTED>01/05/1999</DATE_ENACTED>
<DATE_EFFECTIVE?01/05/1999</DATE_EFFECTIVE>
<DATE_TERMINAL>12/31/2999</DATE_TERMINAL>
<WHOAMI>toc/title02/TocUSCTit02ChaP1</WHOAMI>
</TOCENTRY>
<TOCENTRY>
<NAME>CHAPTER 2 - ORGANIZATION OF CONGRESS</NAME>
<PL> </PL>
<DATESTATUS>Effective?=Enacted</DATESTATUS>
<DATE_ENACTED>01/05/1999</DATE_ENACTED>
<DATE_EFFECTIVE>01/05/1999</DATE_EFFECTIVE>
<DATE_TERMINAL>12/31/2999</DATE_TERMINAL>
<WHOAMI>toc/title02/TocUSCTit02Chap2</WHOAMI>
</TOCENTRY>
<TOCENTRY>
<NAME>CHAPTER 3 - COMPENSATION AND ALLOWANCES
OF MEMBERS</NAME>
<PL> </PL>
<DATESTATUS>Effective?=Enacted</DATESTATUS>
<DATE_ENACTED>01/05/1999</DATE_ENACTED>
<DATE_EFFECTIVE>01/05/1999</DATE_EFFECTIVE>
```

-continued

SAMPLE XM DOCUMENT (TRUNCATED)
FOR TOC OF TITLE 2, UNITED STATES CODE

```
<DATE_TERMINAL>12/31/2999</DATE_TERMINAL>
<WHOAMI>toc/title02/TocUSCTit02Chap3</WHOAMI>
</TOCENTRY>
               TRUNCATED (#1)
</CHILDREN>
<RULE>
<EXTRA>
<MISC1 xml:space="preserve">
Chap.
C.
1.    Election of Senators and Representatives
1
2.    Organization of Congress
21
3.    Compensation and Allowances of Members
31
4.    Officers and Employees of Senate and House of Representative
s
60
5.    Library of Congress                                     1
31
6.    Congressional and Committee Procedure; Investigations
                                                             1
90
7.    Contested Elections (Repealed)                          2
01
8.    Federal Corrupt Practices (Repealed)                    2
41
8A.   Regulation of Lobbying (Repealed)                       2
61
9.    Office of Legislative Counsel                           2
71
9A.   Office of Law Revision Counsel                          2
               TRUNCATED (#2)
01
23.   Government Employee Rights                             12
01
24.   Congressional Accountability                           13
01
25.   Unfunded Mandates Reform                               15
01
26.   Disclosure of Lobbying Activities                      16
01
</MISC1>
</EXTRA>
</RULE>
<ANNOTATION type="findings">
<PUBLIC_LAW_PIECE>
<PL_SESSION> </PL_SESSION>
<PL_LAW> </PL_LAW>
<PL_SECTION> </PL_SECTION>
</PUBLIC_LAW_PIECE>
<ADOPTED_DATE> </ADOPTED_DATE>
<EFFECTIVE_DATE> </EFFECTIVE_DATE>
<TERMINATION_DATE?12/31/1999</TERMINATION_DATE>
<TEXT>
</TEXT>
</ANNOTATION>
<ANNOTATION type="appropriations">
<PUBLIC_LAW_PIECE>
<PL_SESSION> <PL_SESSION>
<PL_LAW> </PL_LAW>
<PL_SECTION> </PL_SECTION>
</PUBLIC_LAW_PIECE>
<ADOPTED_DATE> </ADOPTED_DATE>
<EFFECTIVE_DATE> </EFFECTIVE_DATE>
<TERMINATION_DATE>12/31/2999</TERMINATION_DATE>
<TEXT>
</TEXT>
</ANNOTATION>
               TRUNCATED (#3)
```

The invention claimed is:

1. A computer readable medium encoded with one or more data structures representing an information collection comprising a body of law, the one or more data structures organizing the information collection and facilitating computer access from the computer readable medium of information relating to the body of law, the body of law comprising a plurality of topics and a plurality of parts, including parts that are different versions of each other, the one or more data structures comprising:

an association of each part of the body of law, including different versions thereof, and at least one topic, the association comprising a hierarchical arrangement of topics of the body of law and parts of the body of law in which each part of the body of law and any different version thereof and the associated at least one topic are hierarchically associated;

an association of temporal information comprising one or more dates indicating the legal applicability of a respective part and of the legal applicability of any different version thereof and the respective part of the body of law or respective different version thereof; and an association of information relating to each part and version of the body of law and the at least one topic with which the respective part or version is associated.

2. A computer readable medium according to claim 1, wherein the the one or more data structures enable computer access to a part or version of the body of law based at least on the temporal information associated therewith.

3. A computer readable medium according to claim 1, wherein the temporal information includes a date range, and wherein the one or more data structures enable computer access to a part or version of the body of law based at least on a date encompassed by the date range associated with that part of the body of law.

4. A computer readable medium according to claim 1, wherein the temporal information comprises a date on which that part or version of the body of law was adopted.

5. A computer readable medium according to claim 1, wherein the information relating to each part of the body of law associated with at least one topic comprises the temporal information.

6. A computer readable medium according to claim 1, wherein the association of the information relating to each part of the body of law and at least one topic comprises the at least one topic including such information.

7. A computer readable medium encoded with one or more data structures representing an information collection comprising a body of law, the one or more data structures organizing the information collection and facilitating computer access from the computer readable medium of information relating to the body of law, the one or more data structures comprising:

one or more unique information units, each information unit including at least one part of the body of law, including any different version of the at least one part, and a plurality of topical units, each comprising at least one topic arranged in a scheme for organizing a plurality of interrelated topics;

an association of each topical unit and the at least one information unit, each topical unit including information relating to the at least one information unit associated therewith; and an association of temporal information comprising one or more dates indicating the legal applicability of each part of the body of law and different version thereof and the respective information unit in which information unit the respective part and any different version thereof are included.

8. A computer readable medium according to claim 7, wherein the the one or more data structures enable computer access to an information unit based at least on the temporal information associated therewith.

9. A computer readable medium according to claim 7, wherein the the one or more data structures enable computer access to an information unit based at least on the temporal information associated therewith.

10. A computer readable medium according to claim 7, wherein the association of each information unit and temporal information comprises each information unit including the associated temporal information.

11. A computer readable medium according to claim 7, comprising at least one link between each information unit and the temporal information associated therewith.

12. A computer readable medium according to claim 7, wherein each information unit comprises a structured document including a part or version of the body of law and the temporal information associated therewith.

13. A computer readable medium according to claim 7, wherein the one or more data structures comprises a relational database including records, and each information unit and the temporal information associated therewith are included in a respective record.

14. A computer readable medium according to claim 7, wherein the one or more data structures comprises a plurality of files, each file storing at least one information unit and the temporal information associated therewith.

15. A computer readable medium according to claim 7, wherein the one or more data structures comprises a plurality of files, each file storing at least one topical unit, each information unit associated therewith, and the respective temporal information associated with each information unit associated therewith.

16. A computer readable medium according to claim 7, wherein the one or more data structures comprises a hierarchical arrangement of topical units and associated information units.

17. A computer readable medium according to claim 7, wherein the association of the topical unit and the temporal information associated with at least one of the information units associated with the respective topical unit comprises the topical unit including the temporal information.

18. A computer readable medium according to claim 7, wherein the one or more data structures comprises a hierarchical organization comprising a topic tree that comprises a plurality of nodes, with each node representing one of the topical units, the tree having leaf nodes representing topical units, each topical unit being an atomic topical unit that is not subdivided, and wherein each information unit associated with a respective topical unit is associated with the leaf node representing that topical unit.

19. A computer readable medium according to claim 7, wherein the the one or more data structures comprises at least one table of contents (TOC) associated with the topical units, each TOC including a reference to each information unit associated with the respective topical unit.

20. A computer readable medium according to claim 1 or 7, wherein the temporal information includes a date range.

21. A computer readable medium according to claim 7, wherein the temporal information includes a date range, and wherein the one or more data structures enable computer access to an information unit based at least on a date encompassed by the date range associated with that information unit.

22. A computer readable medium according to claim 1 or 7, wherein the temporal information comprises a date range including a date on which the related part of the body of law is effective, and, if that part of the body of law has a date of termination, the date of termination.

23. A computer readable medium according to claim 7, wherein the temporal information comprises a date on which the part or version of body of law included in the respective information unit was adopted.

24. A computer readable medium according to claim 1 or 7, wherein the body of law includes at least one title of the United States Code.

25. A computer readable medium according to claim 1 or 7, wherein the body of law includes at least one title of the United States Code of Federal Regulations.

26. A computer readable medium according to claim 1 or 7, wherein the body of law includes at least one title of a codified set of laws of at least one state.

27. A method of providing the one or more data structures of claim 7 comprising:
   associating each information unit with applicable temporal information;
   organizing the information units into topical units at least one of which includes the plurality of information units having different versions of the same part of the body of law; and
   configuring the one or more data structures to provide access by a computer, in response to at least one request input to the computer identifying a topical unit and a date, to an information unit of the identified topical unit having temporal information associated therewith that encompasses the date.

28. A computer readable medium according to claim 7, wherein the information relating to each information unit associated with at least one topical unit comprises the temporal information.

29. A computer readable medium according to claim 7, wherein the association of the information relating to each information unit and at least one topical unit comprises the at least one topical unit including such information.

30. A computer readable medium encoded with one or more data structures representing an information collection comprising a body of law, the one or more data structures organizing the information collection and facilitating computer access from the computer readable medium of information relating to the body of law, the one or more data structures comprising:
   a plurality of structured documents arranged in a hierarchy of documents comprising documents including a topic or topics of the body of law and documents including a part of the body of law;
   an association of each of the documents including a part of the body of law and temporal information comprising one or more dates indicating the legal applicability of the respective part, wherein a plurality of the parts of the body of law comprises different versions of the same part of the body of law; and
   each document that includes a part of the body of law including any different version of that part of the body of law and the temporal information associated with the respective part or version.

31. A computer readable medium encoded with one or more data structures representing an information collection comprising a body of law, the one or more data structures organizing the information collection and facilitating computer access from the computer readable medium of information relating to the body of law, the one or more data structures comprising:
   a plurality of lower-level structured documents;
   an association of each of a plurality of parts of the body of law and temporal information comprising one or more dates indicating the legal applicability of the respective part, wherein a plurality of the parts of the body of law comprises different versions of the same part of the body of law, the temporal information being different for different versions of the same part of the body of law;
   each lower level structured document including a different part or different version of the same part of the body of law and including the associated temporal information; and
   at least one higher level structured document, each lower level structured document being in a hierarchical relationship with at least one higher level structured document which higher level structured document includes information relating to the respective lower level structured document.

32. A method of providing the one or more data structures of claim 31, comprising:
   associating each part of the body of law with applicable temporal information;
   including each part of the body of law and its associated temporal information into a lower level structured document;
   associating applicable lower level structured documents with a higher level structured document;
   including in each higher level document information relating to each lower level document associated therewith; and
   configuring the one or more data structures to provide access by a computer, in response to at least one request input to the computer identifying a part of the body of law and a date, to a structured document including the identified part and temporal information associated therewith that encompasses the date.

33. A computer readable medium encoded with one or more data structures representing an information collection related to a common subject, the one or more data structures organizing the information collection and facilitating computer access from the computer readable medium of information relating to the common subject, the one or more data structures, comprising:
   a plurality of lower level structured documents;
   an association of each of a plurality of parts of the common subject and temporal information comprising at least one date indicating a state or status with respect to time of the respective part of the common subject, wherein a plurality of the parts of the common subject comprises different versions of the same part of the common subject, the temporal information being different for different versions of the same part of the common subject;
   each lower level structured document including a different part or different version of the same part of the common subject and including the associated temporal information; and
   at least one higher level structured document, each lower level structured document being in a hierarchical relationship with at least one higher level structured document which higher level structured document includes information relating to the respective lower level structured document.

34. A computer readable medium according to claim 31 or 33, wherein at least one higher level structured document includes a table of contents (TOC) including a reference to each lower level structured document associated therewith.

35. A computer readable medium according to claim 34, wherein at least one higher level structured document includes a TOC having a reference to at least one other higher level structured document hierarchically related to the at least one higher level structured document in an ancestral/descendant relationship.

36. A computer readable medium according to claim 34, wherein at least one higher level structured document includes a TOC having a reference to at least one other higher level structured document and to each lower level structured document referenced by the at least one other higher level structured document, the at least one higher level structured document being hierarchically related in an ancestral/descendant relationship with the at least one other higher level structured document, and each of the lower level structured documents.

37. A computer readable medium according to claim 31 or 33, wherein at least one structured document indicates differences between different versions of the same part.

38. A computer readable medium encoded with one or more data structures representing an information collection comprising a body of law, the one or more data structures organizing the information collection and facilitating computer access from the computer readable medium of information relating to the body of law, the one or more data structures, comprising:
   a hierarchical arrangement of headings in at least one table of contents (TOC) and parts of the body of law, each heading identifying one or more parts of the body of law;
   an association of temporal information comprising one or more dates indicating the legal applicability of a respective part of the body of law and the respective part of the body of law;
   an association of a plurality of parts of the body of law that are different versions of each other and have different temporal information associated therewith and at least one heading of a TOC; and
   an association of the temporal information relating to each part and version of the body of law and each heading with which the respective part or version is associated.

39. A computer readable medium according to claim 38, wherein the one or more data structures enable computer access to a part of the body of law in response to a request by a computer including at least a date of the one or more dates associated with that part.

40. A computer readable medium according to claim 38, wherein the one or more data structures include a structured document for and including each different part of the body of law.

41. A computer readable medium according to claim 40, wherein each TOC is included in a structured document having a reference to each other structured document including a part of the body of law referenced in a heading of that TOC.

42. An information storage and retrieval system, comprising:
   a computer system including a computer display device, a computer input device and a computer-readable medium, the computer system being coupled to access data stored on the computer-readable medium, wherein the medium being encoded with one or more data structures representing an information collection comprising a body of law, the one or more data structures organizing the information collection and facilitating access by the computer system of information from the medium relating to the body of law, the one or more data structures comprising:
   an association of each part of the body of law, including different versions thereof, and at least one topic comprising a hierarchical arrangement of topics of the body of law and parts of the body of law in which each part of the body of law and different version thereof and the associated at least one topic are hierarchically associated; and
   an association of temporal information comprising one or more dates indicating the legal applicability of a respective part and the legal applicability of any different version thereof and the respective part of the body of law or respective different version thereof,
   wherein the computer system being programmed to access the medium and cause to be displayed on the computer display device, in response to input from the computer input device, information identifying at least two parts of the body of law that are different versions of each other together with temporal information associated therewith, and in response to input from the computer input device selecting one of the identified parts displayed identity to access the medium and cause the one identified part to be displayed on the display device.

43. An information storage and retrieval system, comprising:
   a computer system including a computer display device, a computer input device and a computer-readable medium, the computer system being coupled to access data stored on the computer-readable medium;
   the medium being encoded with one or more data structures representing an information collection comprising a body of law, the one or more data structures organizing the information collection and facilitating access by the computer system of information from the medium relating to the body of law, the one or more data structures comprising:
   a hierarchical arrangement of headings in at least one table of contents (TOC) and parts of the body of law, each heading identifying one or more parts of the body of law;
   an association of temporal information comprising one or more dates indicating the legal applicability of a respective part of the body of law and the respective part of the body of law; and
   an association of a plurality of parts of the body of law that are different versions of each other and have different temporal information associated therewith and at least one heading of a TOC;
   the computer system being programmed to access the medium and cause to be displayed on the computer display device, in response to input from the computer input device at least one heading, at least one part associated with the at least one heading and temporal information, and the computer system being programmed to cause to be displayed on the computer display device a displayed part selected with the computer input device that has temporal information associated therewith that encompasses the displayed temporal information.

44. A method of accessing an information collection stored on a computer readable medium using a computer coupled to access the information collection, the medium being encoded with one or more data structures representing an information collection comprising a body of law, the one or more data structures organizing the information collection and facilitating access by the computer system of information from the medium relating to the body of law, the one or more data structures comprising;
   an association of each part of the body of law, including different versions thereof, and at least one topic comprising a hierarchical arrangement of topics of the body of law and parts of the body of law in which each part of the body of law and any different version thereof and the associated at least one topic are hierarchically associated; and an association of temporal information comprising one or more dates indicating the legal applicability of a respective part and the legal applicability of any different version thereof and the respective part of the body of law or respective different version thereof;

the method comprising:

displaying on a computer display device coupled to the computer dates in association with information identifying at least two parts that are different versions of each other; and displaying on the computer display device that part of the body of law that is selected with a computer input device coupled to the computer.

45. A method of accessing an information collection stored on a computer readable medium using a computer coupled to access the information collection, the medium being encoded with one or more data structures representing an information collection comprising a body of law, the one or more data structures organizing the information collection and facilitating access by the computer system of information from the medium relating to the body of law, the one or more data structures comprising:

an association of each part of the body of law, including different versions thereof, and at least one topic comprising a hierarchical arrangement of topics of the body of law and parts of the body of law in which each part of the body of law and any different version thereof and the associated at least one topic are hierarchically associated; and an association of temporal information comprising one or more dates indicating the legal applicability of a respective part and the legal applicability of any different version thereof and the respective part of the body of law or respective different version thereof;

the method comprising:

inputting to the computer using a computer input device information identifying a part of the body of law and a date; and in response thereto, the computer causing the computer display device to display the identified part which has temporal information encompassing the inputted date.

46. A method according to claim 44, wherein the information collection includes a table of contents (TOC) having headings with which one or more parts of the body of law are associated, each heading being associated with temporal information indicating the applicability of parts associated with the respective heading, the method comprising:

displaying on the computer display device a heading and the temporal information associated therewith;

inputting to the computer using a computer input device a selection of displayed temporal information associated with a heading; and in response thereto, displaying on the computer display device the part of the body of law in the displayed heading associated with the temporal information that is selected using the computer input device.

47. A method for encoding a computer readable medium with one or more data structures representing an information collection comprising a body of law, the one or more data structures organizing the information collection and facilitating computer access from the computer readable medium of information relating to the body of law, the body of law comprising a plurality of topics and a plurality of parts, including parts that are different versions of each other, the method comprising creating in the one or more data structures:

an association of each part of the body of law, including different versions thereof, and at least one topic in a hierarchical arrangement of topics of the body of law and parts of the body of law in which each part of the body of law and any different version thereof and the associated at least one topic are hierarchically associated;

an association of temporal information comprising one or more dates indicating the legal applicability of a respective part and the legal applicability of any different version thereof and the respective part of the body of law or respective different version thereof; and an association of information relating to each part or version of the body of law and the at least one topic with which the respective part or version is associated.

48. A method for encoding a computer readable medium with one or more data structures representing an information collection comprising a body of law, the one or more data structures organizing the information collection and facilitating computer access from the computer readable medium of information relating to the body of law, the method comprising creating in the one or more data structures:

one or more unique information units, each including at least one part of the body of law including any different version of the at least one part, and a plurality of topical units, each comprising at least one topic;

an association of each topical unit and the at least one information unit, each topical unit including information relating to the at least one information unit associated therewith; and an association of temporal information comprising one or more dates indicating the legal applicability of each part of the body of law and different version thereof and the respective information unit in which the respective part and any different version thereof are included;

the method comprising storing the one or more data structures in the computer readable medium.

* * * * *

UNITED STATES PATENT AND TRADEMARK OFFICE
CERTIFICATE OF CORRECTION

| | | |
|---|---|---|
| PATENT NO. | : 7,412,463 B2 | |
| APPLICATION NO. | : 10/045586 | |
| DATED | : August 12, 2008 | |
| INVENTOR(S) | : Fred C. Mitchell, Peter Mosca and James Michael Snyder | |

It is certified that error appears in the above-identified patent and that said Letters Patent is hereby corrected as shown below:

Column 25, line 12, delete "any"; line 17, delete the text "of the legal applicability of any"; line 24, delete the first occurrence of the repeated word "the"; line 54, after "each", insert --topical unit--; line 57, delete "the".

Column 25, lines 15 and 61, column 29, line 30, column 30, line 8, column 31, lines 6 and 35, and column 32, lines 25 and 48, change "comprising", each occurrence, to --, which temporal information comprises--.

Column 25, lines 18 and 63, column 31, lines 9 and 39, and column 32, lines 29 and 50, after "thereof", each occurrence, insert a comma.

Column 25, lines 53 and 65, column 31, lines 3 and 32, and column 32, lines 22 and 41, change "any", each occurrence, to --each--.

Column 26, line 8, after "therewith", insert text --, directly or through a topical unit with which the information unit is associated--; line 47, after "nodes" and before the following comma, insert text --including leaf nodes--; lines 48-49, delete text ", the tree having leaf nodes representing topical units, each topical unit being" and insert text --and each leaf node representing--.

Column 27, line 54, insert --each-- before, and text --at least one-- after, "comprises" and change "versions" to --version--; line 57, change "any" to --a--.

Column 29, line 15, after "document", delete comma; line 28, after text "body of law" and before the immediately following comma, insert text --including parts that are different versions of each other--; line 32, after text "tive part" at start of line, insert text --and version--, after "law", insert a comma, and after text "respective part", insert text --or version--.

Column 29, line 59, after "medium", change comma to semicolon.

Column 29, line 60 and column 30, line 13, change "being", each occurrence, to --is--.

Column 30, line 5, after text "body of law and", insert word --each--.

UNITED STATES PATENT AND TRADEMARK OFFICE
CERTIFICATE OF CORRECTION

PATENT NO.        : 7,412,463 B2
APPLICATION NO.   : 10/045586
DATED             : August 12, 2008
INVENTOR(S)       : Fred C. Mitchell, Peter Mosca and James Michael Snyder It is certified that error appears in the above-identified patent and that said Letters Patent is hereby corrected as shown below:

Column 30, line 10, column 31, lines 8 and 37, and column 32, line 27, delete each occurrence of the text "the legal applicability of any".

Column 30, line 12, change comma at end of line to semicolon; lines 20-21, delete text "displayed identity".

Signed and Sealed this

Sixteenth Day of June, 2009

JOHN DOLL
*Acting Director of the United States Patent and Trademark Office*